(12) United States Patent
Yamamoto et al.

(10) Patent No.: US 7,681,128 B2
(45) Date of Patent: Mar. 16, 2010

(54) MULTIMEDIA PLAYER AND METHOD OF DISPLAYING ON-SCREEN MENU

(75) Inventors: Ryuji Yamamoto, Tokyo (JP); Tyler Jon Daniel, Tokyo (JP); Shigeru Enomoto, Kanagawa (JP); Akio Ohba, Kanagawa (JP); Shuji Hiramatsu, Tokyo (JP); Shunsuke Kunieda, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 222 days.

(21) Appl. No.: 11/628,833

(22) PCT Filed: May 19, 2005

(86) PCT No.: PCT/JP2005/009194

§ 371 (c)(1),
(2), (4) Date: Aug. 14, 2007

(87) PCT Pub. No.: WO2005/121932

PCT Pub. Date: Dec. 22, 2005

(65) Prior Publication Data

US 2008/0141172 A1    Jun. 12, 2008

(30) Foreign Application Priority Data

Jun. 9, 2004    (JP) .............................. 2004-170753

(51) Int. Cl.
G06F 3/00    (2006.01)
(52) U.S. Cl. .................. 715/717; 715/716; 715/835
(58) Field of Classification Search ................. 715/716, 715/717, 810, 835
See application file for complete search history.

(56) References Cited

U.S. PATENT DOCUMENTS 5,410,326 A    4/1995 Goldstein (Continued)

FOREIGN PATENT DOCUMENTS

JP    09-097162    4/1997

(Continued)

OTHER PUBLICATIONS

PSX DESR-7000/DESR-5000 Hard disk equipped DVD recorder User's manual, Japan, Sony Corporation, 2003, pp. 3, 26, 38, 54-57, 60, Mentioned in Japanese Office action dated Oct. 3, 2006 for the corresponding Japanese Application.

(Continued)

*Primary Examiner*—Dennis Bonshock
(74) *Attorney, Agent, or Firm*—Katten Muchin Rosenman LLP

(57) ABSTRACT

Favorable visual appearance and ease of operation are required in the user interface of digital home appliances using a television screen. An array of function icons including multiple function icons representing respective playing functions and an array of content icons including multiple content icons representing items of contents that can be played are displayed practically at the center of an on-screen menu such that the arrays intersect. A moving image icon, which is a function icon displayed in an area of intersection in which the array of function icons and the array of content icons intersect, is highlighted by a color different from that of the other function icons and by an enlarged view. An icon in focus immediately below the moving image icon is also displayed in an expanded view. If an external appliance is connected via a network, contents in the external appliance are also displayed in the array of content icons.

20 Claims, 12 Drawing Sheets

U.S. PATENT DOCUMENTS

| | | |
|---|---|---|
| 6,344,880 B1 | 2/2002 | Takahashi et al. |
| 6,425,129 B1* | 7/2002 | Sciammarella et al. ........ 725/38 |
| 6,538,672 B1* | 3/2003 | Dobbelaar ................. 715/810 |
| 6,690,391 B1* | 2/2004 | Proehl et al. ................ 715/720 |
| 6,976,228 B2* | 12/2005 | Bernhardson ............... 715/830 |
| 7,055,104 B1* | 5/2006 | Billmaier et al. ............ 715/765 |
| 2004/0233239 A1* | 11/2004 | Lahdesmaki ............... 345/810 |

FOREIGN PATENT DOCUMENTS

| | | |
|---|---|---|
| JP | 09-204286 A | 8/1997 |
| JP | 2001-265482 | 9/2001 |
| JP | 2002-044218 A | 2/2002 |
| JP | 2002-287950 A | 10/2002 |
| WO | 99/07111 | 2/1999 |
| WO | 99/59072 | 11/1999 |
| WO | WO 02/091114 A2 | 11/2002 |
| WO | 03/063474 | 7/2003 |

OTHER PUBLICATIONS

International Search Report dated Aug. 30, 2005 from the corresponding PCT/JP2005/009194, In English.

International Preliminary Examination Report on Patentability from the corresponding PCT/JP2005/009194, In English.

Office Action dated Aug. 16, 2005 for the corresponding Japanese Patent Application 2004-170753, In English.

Office Action dated Oct. 3, 2006 for the corresponding Japanese Patent Application 2004-170753, In English.

Chinese First Office Action dated Dec. 14, 2007, from the corresponding Chinese Application.

Korean Notice of Preliminary Rejection dated Mar. 29, 2008, from corresponding Korean Application No. 10-2007-7000551.

Supplementary European Search Report dated Jul. 13, 2007, from corresponding European Application 05741645.5-1522.

Communication pursuant to Article 94(3) EPC dated Aug. 13, 2008, from the corresponding European Application.

* cited by examiner

FIG. 7
(a)
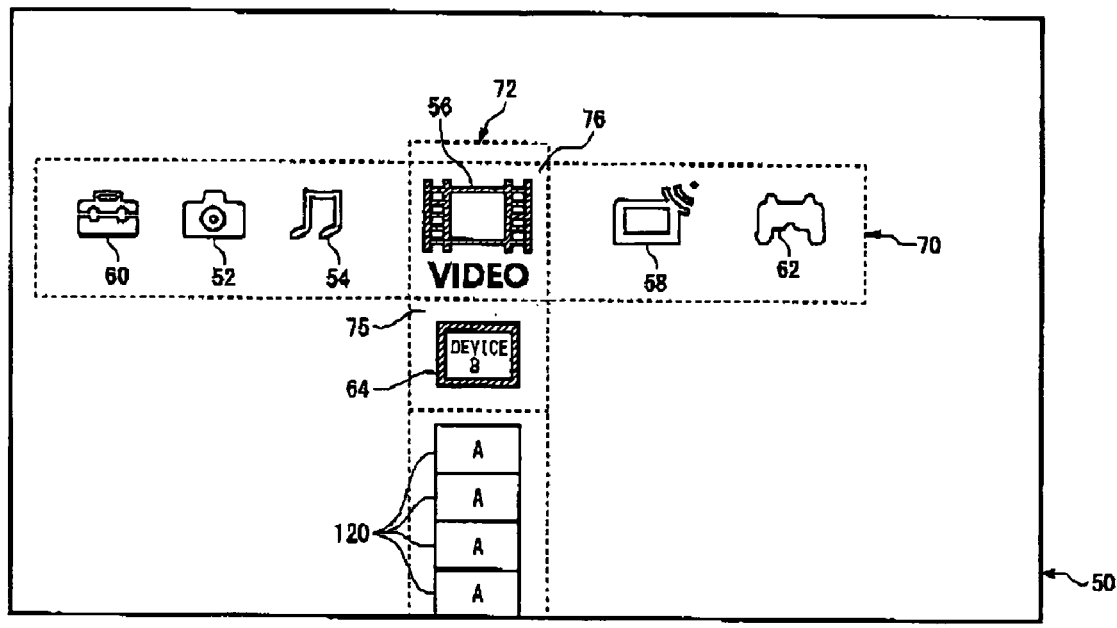
(b)
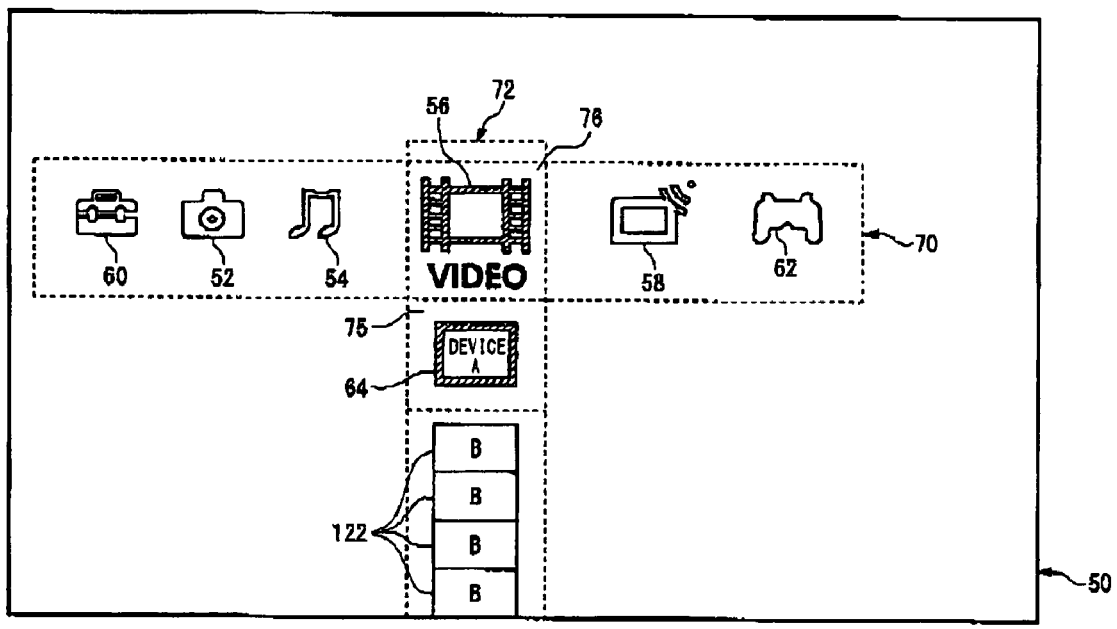

FIG. 8
(a)
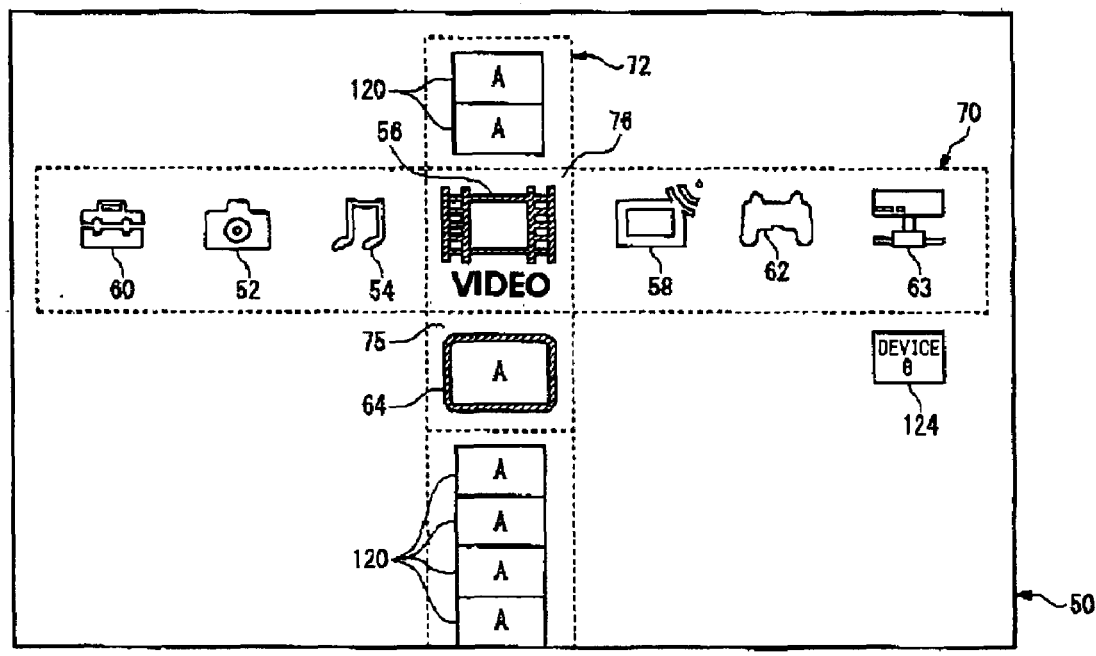
(b)
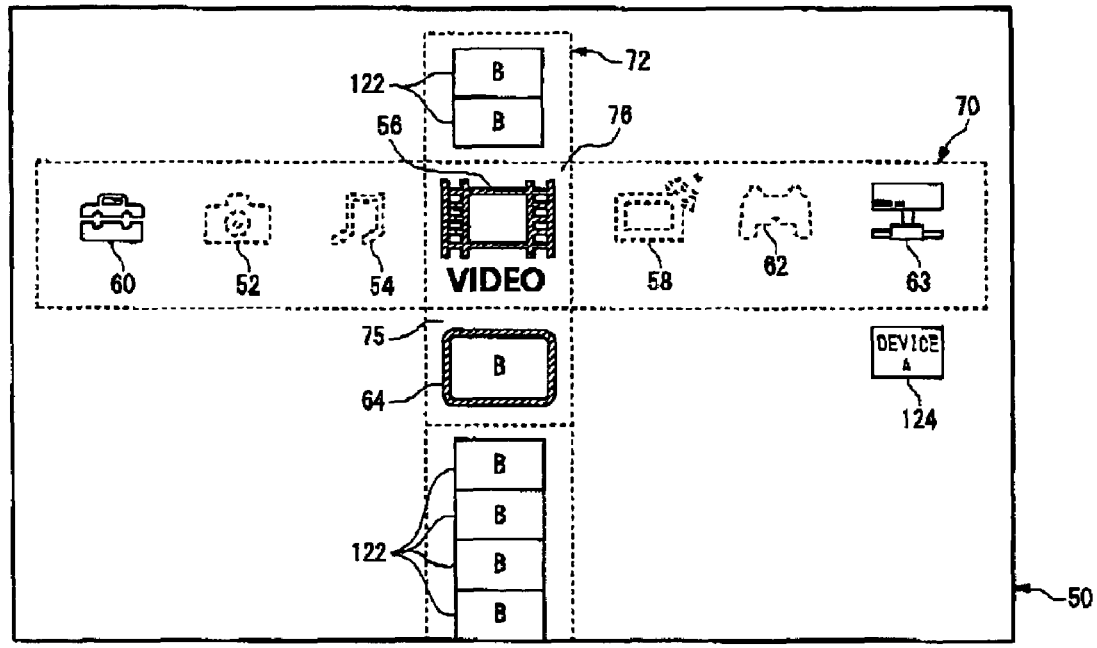

FIG. 9
(a)
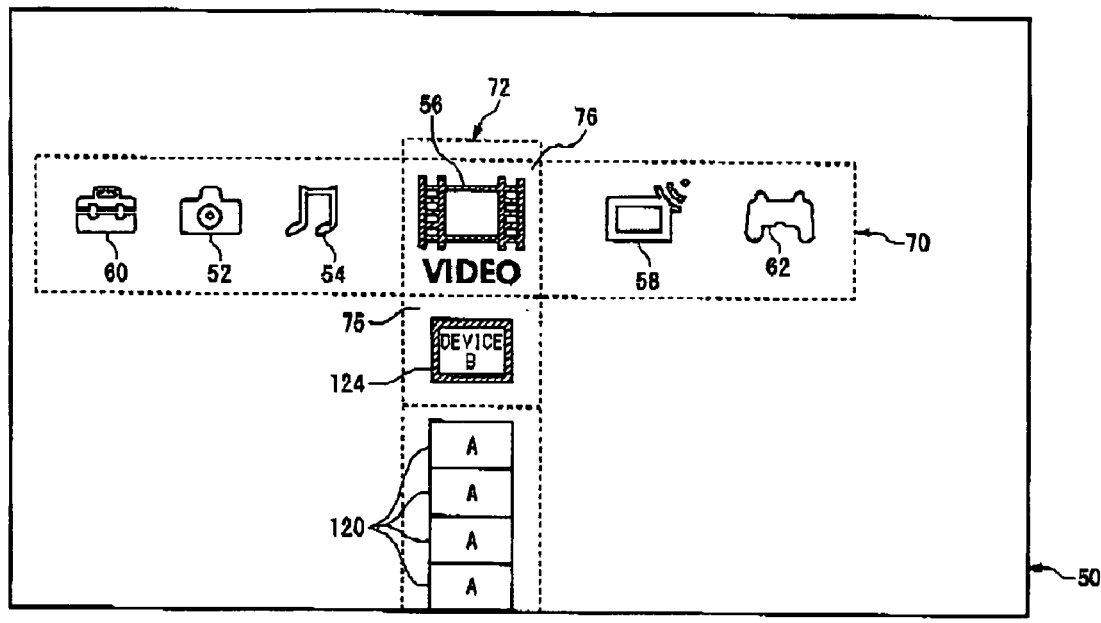
(b)
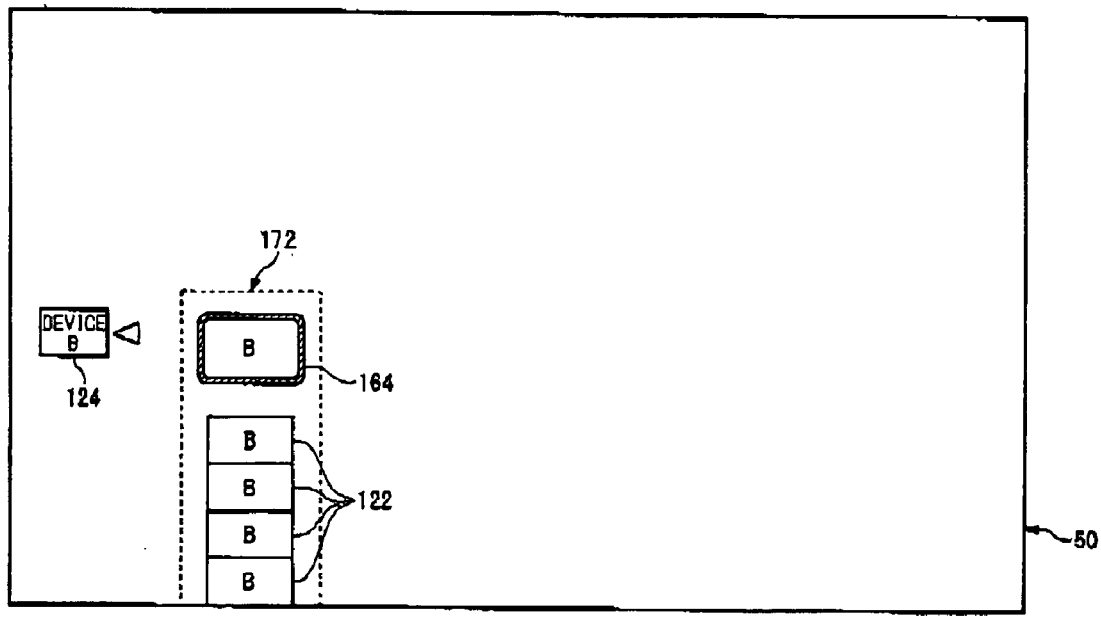

FIG. 10
(a)
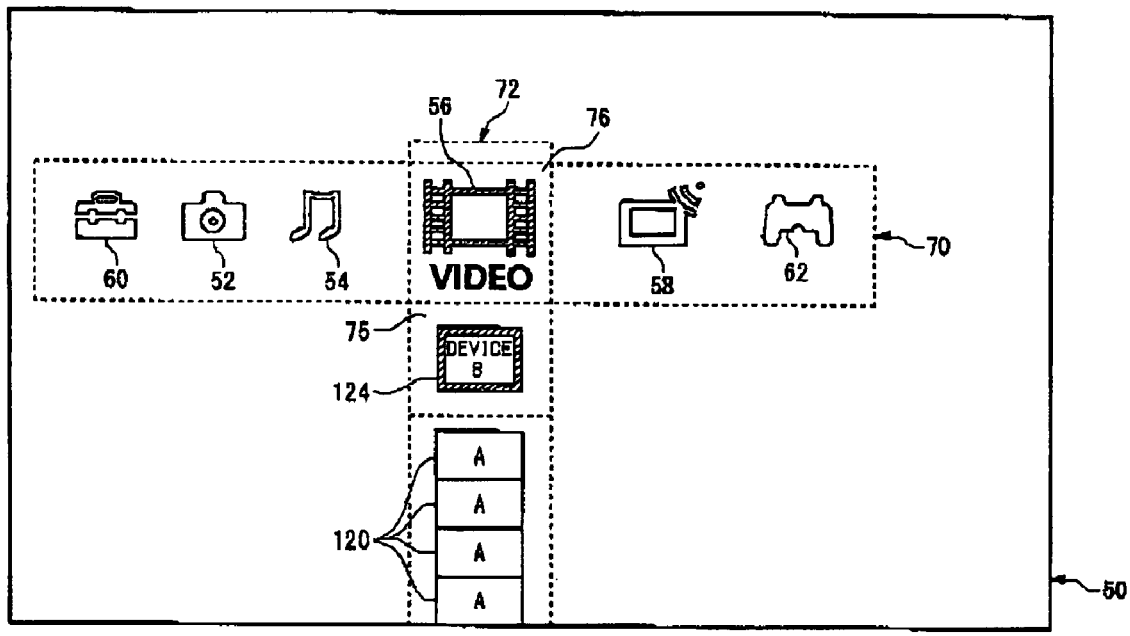
(b)
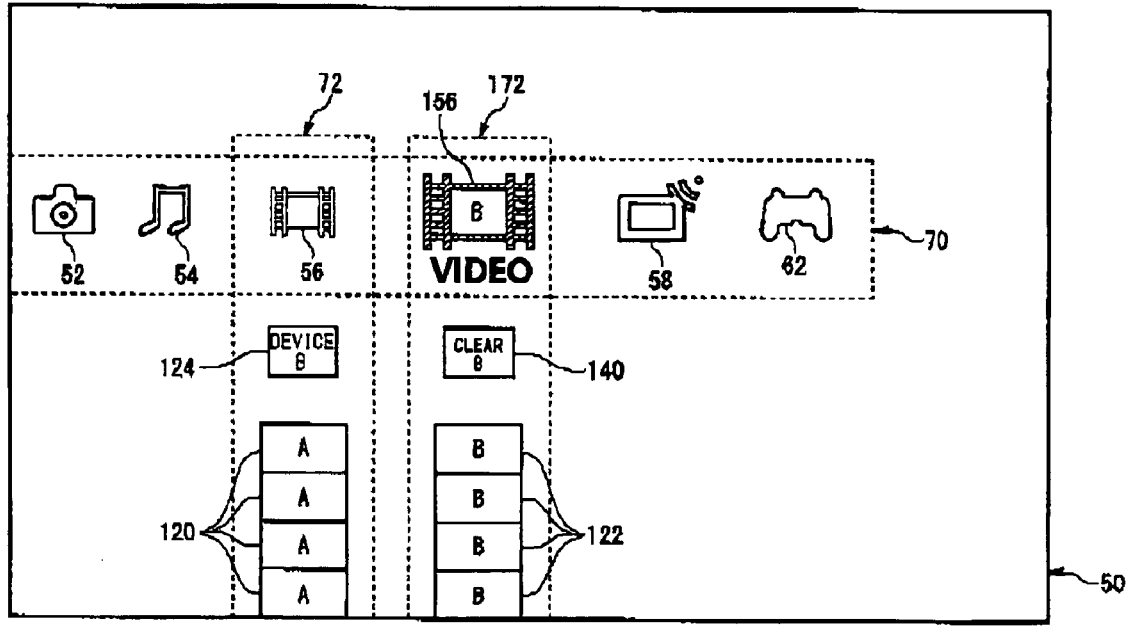

FIG. 11
(a)
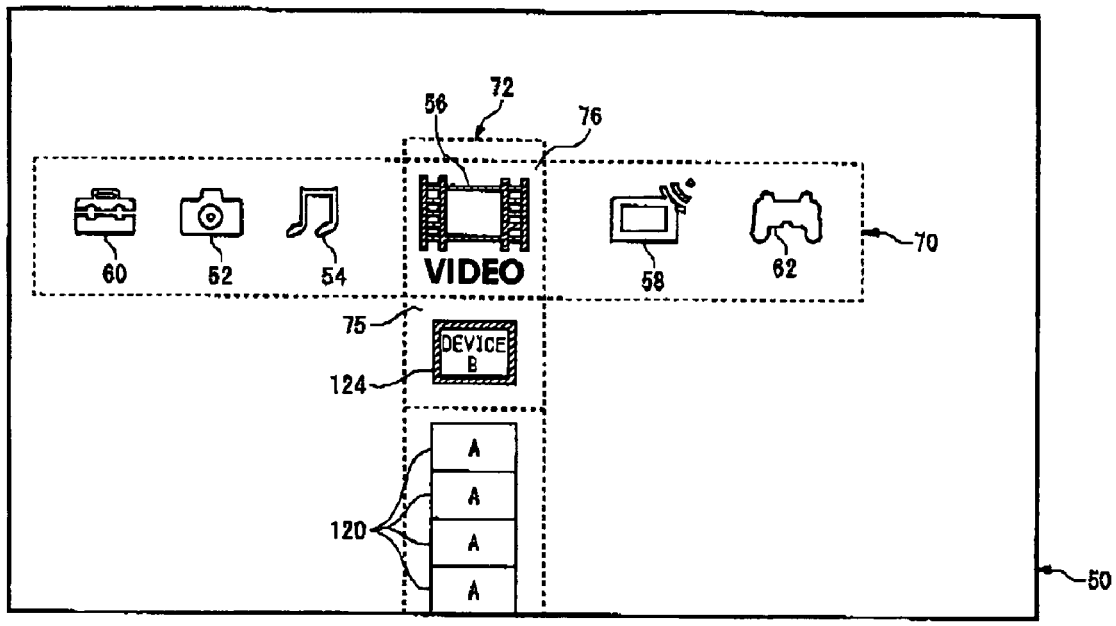
(b)
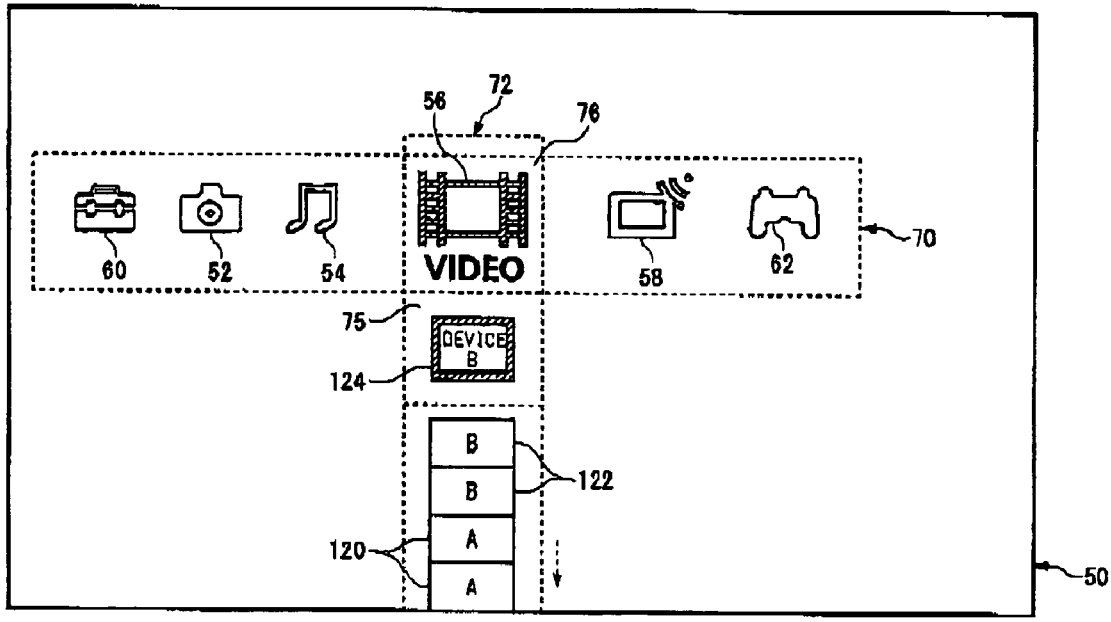

FIG. 12
(a)
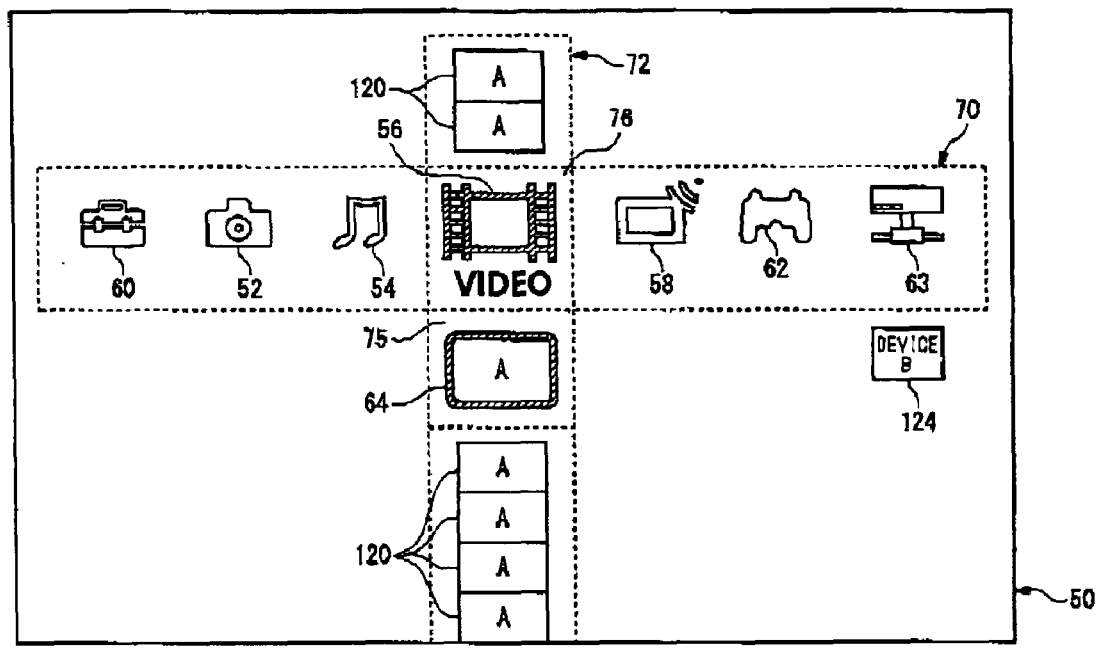
(b)
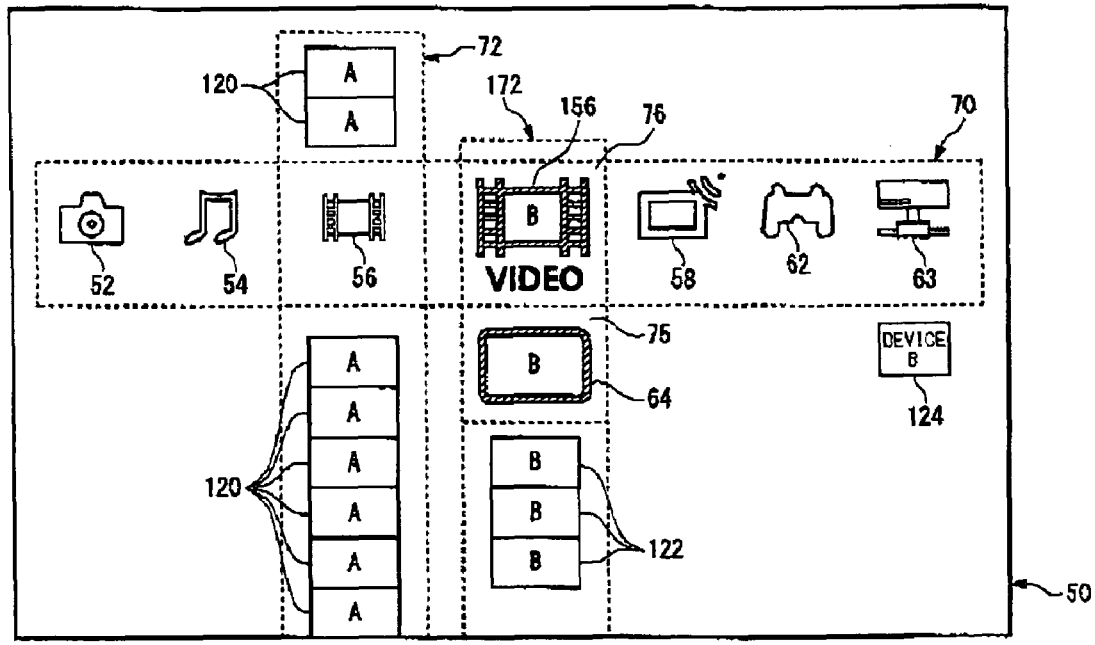

MULTIMEDIA PLAYER AND METHOD OF DISPLAYING ON-SCREEN MENU

This application is a National Phase Application of International Application No. PCT/JP2005/009194, filed May 19, 2005, which claims the benefit under 35 U.S.C. 119 (a-e) of Japanese Application No. 2004-170753 filed Jun. 9, 2004, which is herein incorporated by reference.

TECHNICAL FIELD

The present invention relates to a multimedia player and a method of displaying on-screen menu. More particularly, the present invention relates to a user interface technology for giving an instruction for multimedia playing.

BACKGROUND TECHNOLOGY

Recently, the variety of so-called digital home appliances is growing. For example, a hard disk recorder, a digital versatile disk (DVD) recorder or a multiple function hard disk recorder and DVD recorder is available for use in recording television programs. Also, in addition to playing ordinary compact disks (CDs), various forms of music playing are now available such as reproducing compressed data recorded in various kinds of memory cards or a hard disk.

Digital home appliances and, more particularly, appliances for playing images or music, are expected to be used by multiple people at the same time. As such, they are often placed in a shared space at home such as a living room, unlike personal computers. A control panel or a controller of a digital home appliance is usually designed with a small number of buttons and a narrow display area. Therefore, items for control are sometimes displayed on a television screen, which is separate from the appliance. One usually watches a television screen at some distance. Therefore, a string of characters in small sizes or movement of a small pointer as are displayed on a PC screen is not suitable for display on a television screen. Accordingly, favorable visual appearance and ease of operation are required in the user interface of digital home appliances using a television screen. Particularly, non-PC users may not necessarily feel comfortable if a method of operation usually employed in PCs is used.

As more and more digital home appliances are built with network functions, they are also expected to operate to retrieve contents from another digital home appliance connected to a home network. As home networks will become more widely available, there will likely be demands for user interface design that does not impair operability even when the digital appliance is connected to a network.

DISCLOSURE OF THE INVENTION

In this background, a general purpose of the present invention is to enhance user convenience in multimedia playing over a network.

A multimedia player capable of playing contents according to one embodiment of the present invention comprises: a control which acquires an instruction for playing of content via a user's manipulation; a storage which stores data for a plurality of function icons representing respective types of content playing functions, the content to be played by the player, and data for a plurality of content icons representing respective items of contents; a network controller which detects an external appliance connected to the player via a network and acquires the items of contents to be played from the external appliance thus detected; a display output module which outputs image data for an on-screen menu related to playing of the content to a display device and which plays the content acquired from the storage in response to the user's instruction acquired by the control; a display controller which generates the image data for the on-screen menu with a two-dimensional array which includes a first array comprising the plurality of function icons arranged in a specific direction on a screen and which also includes a second array comprising the plurality of content icons in a direction intersecting the first array on the screen. When one of the content playing functions is selected in accordance with the user's instruction acquired by the control, the display controller displays, as the content icons corresponding to the selected content playing function, one or both of the content icons representing the items of contents acquired from the storage and the content icons representing the items of contents acquired from the external appliance, in the on-screen menu.

The term "content" refers to information including moving images, still images, audio, texts and programs that are played, displayed or run by respective types of information conveying means. The "content" may include information for entertainment purposes. While the term "content" refers to an abstract notion of what is played in general, the term "item of content" may refer to any of individual pieces of data files for moving image data, still image data, audio data, text data or program data. The notion of "acquiring items of contents" may refer to acquiring of data such as a list of content names or file names as "items of contents". The term "playing" may refer to running of a program as well as playing of images or audio. The term "external appliance" may refer to an electronic appliance similar to the one according to the embodiment and having functions such as those for content storage, content playing and network communication.

According to this embodiment, the player can playing contents stored in an external appliance over a network. Moreover, users can provide an instruction for playing easily, by using an interface similar to the one for the contents stored in the player. The above embodiment can also achieve proper operability irrespective of whether or not contents are stored in a device on a network other than the player.

Another embodiment of the present invention relates to a method of displaying an on-screen menu. The method is directed to displaying an on-screen menu in a content player and comprises: reading data for a plurality of function icons representing respective types of content playing functions, and data for a plurality of content icons representing respective items of contents; detecting an external appliance connected to the player via a network; acquiring the items of contents to be played from the external appliance thus detected via the network; generating image data for the on-screen menu with a two-dimensional array which includes a first array comprising the plurality of function icons arranged in a specific direction on a screen and which also includes a second array comprising the plurality of content icons in a direction intersecting the first array on the screen; and outputting the image data for the on-screen menu related to playing of the content to a display device. When one of the content playing functions is selected in accordance with the user's instruction, the generating displays, as the content icons corresponding to the selected content playing function, one or both of the content icons representing the items of contents acquired from the player and the content icons representing the items of contents acquired from the external appliance, in the on-screen menu.

The above embodiment can also achieve proper operability irrespective of whether or not contents are stored in a device on a network other than the player.

According to the present invention, user convenience in multimedia playing is enhanced.

BRIEF DESCRIPTION OF THE DRAWINGS

FIGS. 7A and 7B schematically show how items in an on-screen menu make transitions according to a fourth embodiment.

FIGS. 8A and 8B schematically show how items in an on-screen menu make transitions according to a fifth embodiment.

FIGS. 9A and 9B schematically show how items in an on-screen menu make transitions according to a sixth embodiment.

FIGS. 10A and 10B schematically show how items in an on-screen menu make transitions according to a seventh embodiment.

FIGS. 11A and 11B schematically show how items in an on-screen menu make transitions according to an eighth embodiment.

FIGS. 12A and 12B schematically show how items in an on-screen menu make transitions according to a ninth embodiment.

20 multimedia player, 40 control, 46 display output module, 48 display controller, 50 on-screen menu, 80 storage, 86 network controller, 124 device icon

BEST MODE FOR CARRYING OUT THE INVENTION

First Embodiment

A multimedia player according to a first embodiment of the present invention is a multifunction device capable of playing or running multiple types of contents such as still images, moving images, music, broadcast and games. The device is designed to use a screen of a television set. To manipulate the device, users use items displayed on a screen and directional buttons on a controller. In order to play multiple contents on a PC, programs, such as a viewer, dedicated to the content type need be used. These dedicated programs are produced by different vendors. Normally, they do not share a common interface nor provide consistent feel as the user uses the programs. Integrating these dedicated programs under a common interface such as a portal screen would merely result in aggregation. Further, because it requires more than a little time to start each program, users cannot comfortably switch between programs.

A multimedia player according to the embodiment integrates playing of multiple types of contents under a common user interface, so as to offer vendor-independent operability to users. Moreover, user convenience is enhanced by offering an interface that achieves viewability and operability that appeal to the user's intuition in order to allow users to provide an instruction to playing desired content easily, regardless of where on a network the content is stored.

Figure 1:
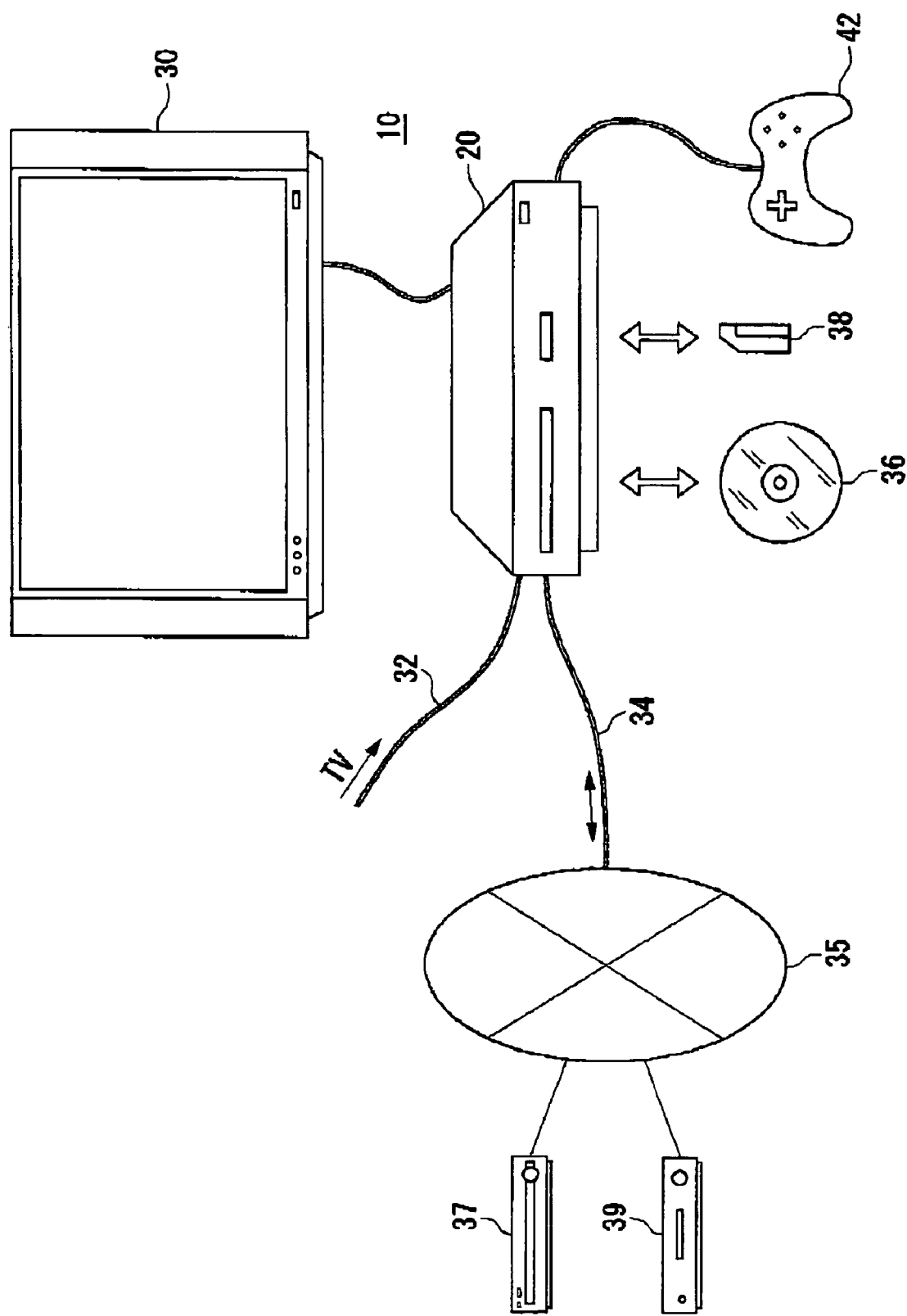
FIG. 1 shows the basic structure of a multimedia playing system.

FIG. 1 shows the basic structure of a multimedia playing system. A multimedia player 20 plays a central role in a multimedia playing system 10. A television set 30 and a controller 42 are connected to the multimedia player 20. The television set 30 is provided with the function of displaying or outputting images or audio output from the multimedia player 20 and is externally connected to the multimedia player 20. The controller 42 is a device for acquiring an instruction related to playing of contents by being manipulated by a user. The controller 42 functions as part of the multimedia playing system 10. The controller 42 may be implemented by a game controller as illustrated. Alternatively, the controller 42 may be implemented by a remote controller used to control various functions provided in the multimedia player 20.

Information is input to the multimedia player 20 via various recording mediums and cables. For example, information like images or audio of programs (broadcast contents) is input to the multimedia player 20 via an antenna cable 32. Broadcast contents may be recorded by the multimedia player 20 or subject to image processing by the multimedia player 20 before being output to the television set 30. Contents stored in an external appliance connected to a LAN 35 are also input to the multimedia player 20 via a network cable 34. FIG. 1 shows a first external appliance 37 and a second external appliance 39 as examples of external appliances connected to the LAN 35. Contents stored in the first external appliance 37 and in the second external appliance 39 are input to the multimedia player 20 via the network cable 34. The input contents are stored or buffered in the multimedia player 20 before being played. The multimedia player 20 allows the television set 30 to display an on-screen menu to provide an instruction to play content. The on-screen menu shows items of contents stored in the multimedia player 20 and items of contents stored in the first external appliance 37 or the second external appliance 39. The contents can be played by the multimedia player 20 in accordance with a user's instruction.

The multimedia player 20 is provided with the functions of accessing an optical disk 36 such as a DVD or a CD to read or write data and accessing a detachable memory card to read or write data. The multimedia player 20 may read data for a movie or a music album from the optical disk 36 and may read data for images or videos from the memory card 38.

Figure 2:
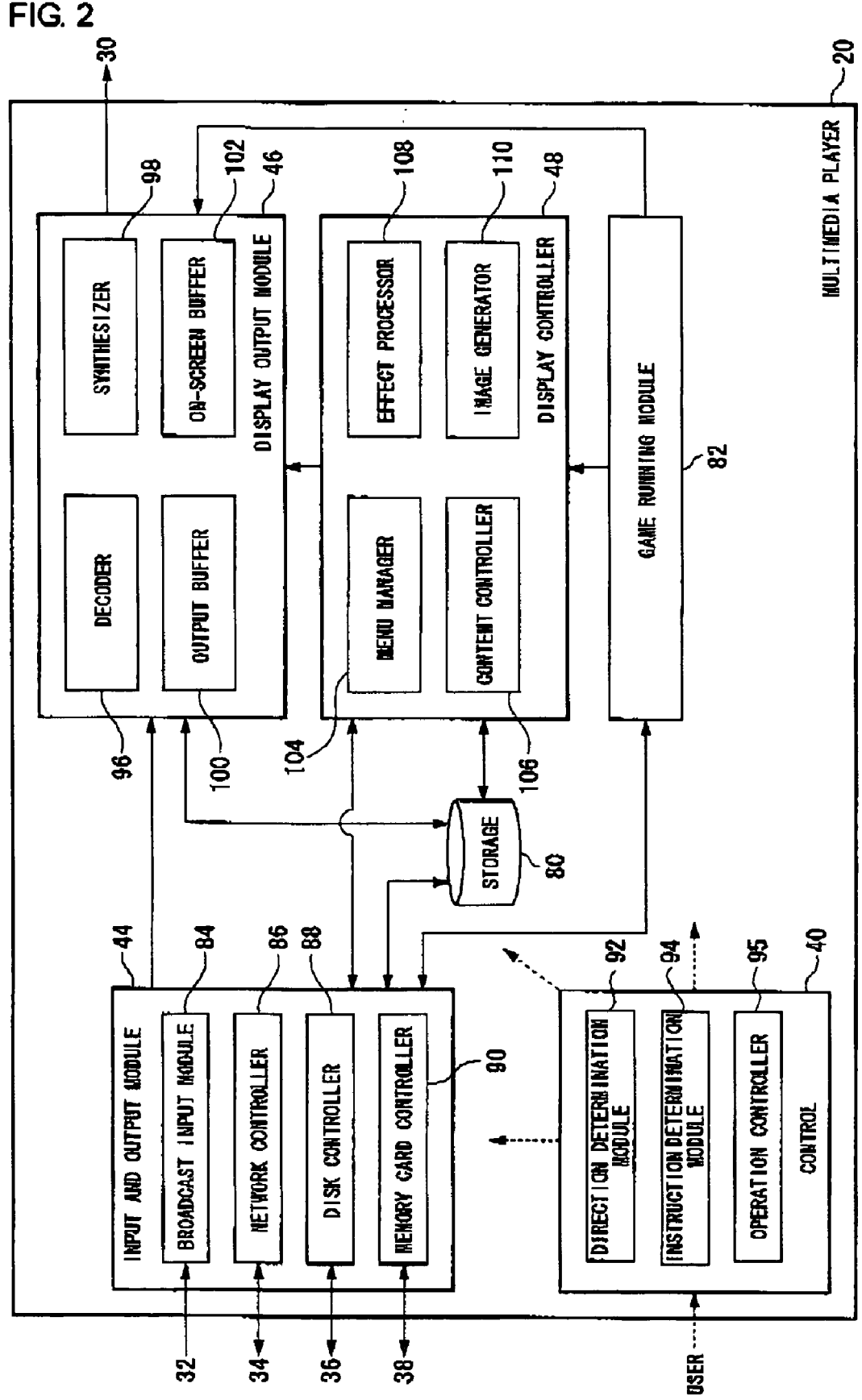
FIG. 2 is a functional block diagram showing the structure of a multimedia player.

FIG. 2 is a functional block diagram showing the structure of the multimedia player. The multimedia player 20 comprises a control 40, an input and output module 44, a display output module 46, a display controller 48, a storage 80 and a game running module 82. The multimedia player 20 is implemented hardwarewise by a CPU, hard disk, RAM, ROM, a rendering circuit, etc., and softwarewise by a program implementing the functions of data input, data latch, image processing, rendering, etc. FIG. 2 depicts functional blocks implemented by the coordination of hardware and software. Therefore, the functional blocks may be implemented by a variety of manners using a combination of hardware and software.

The control 40 includes a direction determination module 92, an instruction determination module 94 and an operation controller 95. The direction determination module 92 acquires instructions related to up/down/left/right directions entered by the user manipulating the controller 42. The instruction determination module 94 acquires instructions such as "content playing", "pause playing" and "invoke on-screen menu" entered by the user manipulating the controller 42. The operation controller 95 controls the input and output module 44, the display output module 46, the display controller 48 and the game running module 82 in accordance with the instructions acquired by the direction determination module 92 and the instruction determination module 94.

The input and output module 44 includes a broadcast input module 84, a network controller 86, a disk controller 88 and a memory card controller 90. The broadcast input module 84 receives broadcast contents via the antenna cable 32. The network controller 86 processes the input of the contents stored in external appliances and the output of various data via the network cable 34. The disk controller 88 controls the input of data stored in the optical disk 36 and the writing of data to the optical disk 36. The memory card controller 90 accesses the memory card 38 for data input and output. The network controller 86 detects an external appliance connected to the LAN 35. The network controller 86 acquires, from the external appliances thus detected including the first external appliance 37 and the second external appliance, information including: network information such as an IP address and a MAC address; names and IDs of the appliances; category IDs of contents stored; and thumbnails, names and data sizes of contents. The network controller 86 stores the information thus acquired in the storage 80. Data input via various components constituting the input and output module 44 is sent to the display output module 46, the display controller 48, the storage 80 and the game running module 82.

The storage unit 80 stores broadcast contents input via the antenna cable 32, contents in the external appliances input via the network cable 34, contents like music and movie read from the optical disk 36, and contents like still images and moving images read from the memory card 38. The storage 80 further stores data for multiple function icons representing the respective types of playing functions, contents played by the display output module 46 and contents run by the game running module 82, and data for multiple content icons representing the respective items of contents stored in the storage 80. Content icons representing the items of contents stored in the external appliances, the optical disk 36 and the memory card 38 are acquired by the network controller 86, the disk controller 88 and the memory card controller 90, respectively, from the first external appliance 37, the second external appliance 39, the optical disk 36 and the memory card 38 and stored in the storage 80. The function icons and the content icons are used to display items of the on-screen menu.

The display output module 46 includes a decoder 96, an output buffer 100, an on-screen buffer 102 and a synthesizer 98. The decoder 96 decodes coded data. The output buffer 100 temporarily stores playing data before sending it to the television set 30. The on-screen buffer 102 temporarily stores image data for on-screen display before outputting the same to the television set 30. The synthesizer 98 synthesizes the playing data and the image data. The decoder 96 decodes coded data like broadcast contents, movie, music and the like received from the input and output module 44 or the storage 80, in accordance with the user's instruction acquired by the control 40, and stores the decoded data to the output buffer 100. The on-screen buffer 102 temporarily stores, for example, the image data for the on-screen menu generated by the display controller 48, as the image data for on-screen display. A synthesizer 98 synthesizes the playing data stored in the output buffer 100 and the image data for the on-screen menu stored in the on-screen buffer 102 and converts the synthesized data into an analog signal before outputting the same to the television set 30.

The display controller 48 includes a menu manager 104, a content controller 106, an effect processor 108 and an image generator 110. The menu manager 104 manages the types of playing functions and items of contents corresponding to the respective playing functions as menu items. The content controller 106 controls playing or running of the contents. The effect processor 108 processes operations related to icons in an on-screen menu. The image generator 110 generates image data for an on-screen menu. The menu manager 104 maintains a list of items of contents stored in the storage 80 and items of contents input via the input and output module 44, and also maintains current selections of a playing function type and item of content. The playing function includes, for example, still image playing function, music playing function, moving image playing function, broadcast display function and game running function. Further, it includes various configuration functions and network device selection function. In accordance with the user's instruction acquired by the control 40, the content controller 106 controls switching between playing functions, start and stop of content playing, data input via the input and output module 44, reading of data from the storage 80 and processes performed by the game running module 82.

The image generator 110 generates an on-screen menu constituted by an array of multiple function icons arranged horizontally and an array of multiple content icons arranged vertically. These two arrays intersect each other practically at the center of the screen. The image generator 110 visually highlights the function icon and the content icon that are displayed at the intersection and in the neighborhood of the intersection to distinguish them from the other icons. The effect processor 108 scrolls the array of function icons and the array of content icons and highlights function icons and content icons in focus. An icon may be highlighted by a format of representation different from that the other icons. For example, an icon may be highlighted by a distinguishing color, change in color, enlarged view or transition to an enlarged view.

The game running module 82 runs a game program read from the small optical disk 86 by the disk controller 88 or a game program read from the storage 80. In accordance with the user's instruction acquired by the control 40, the game running module 82 processes operations related to the game program and sends game images and audio to the display output module 46.

Figure 3:
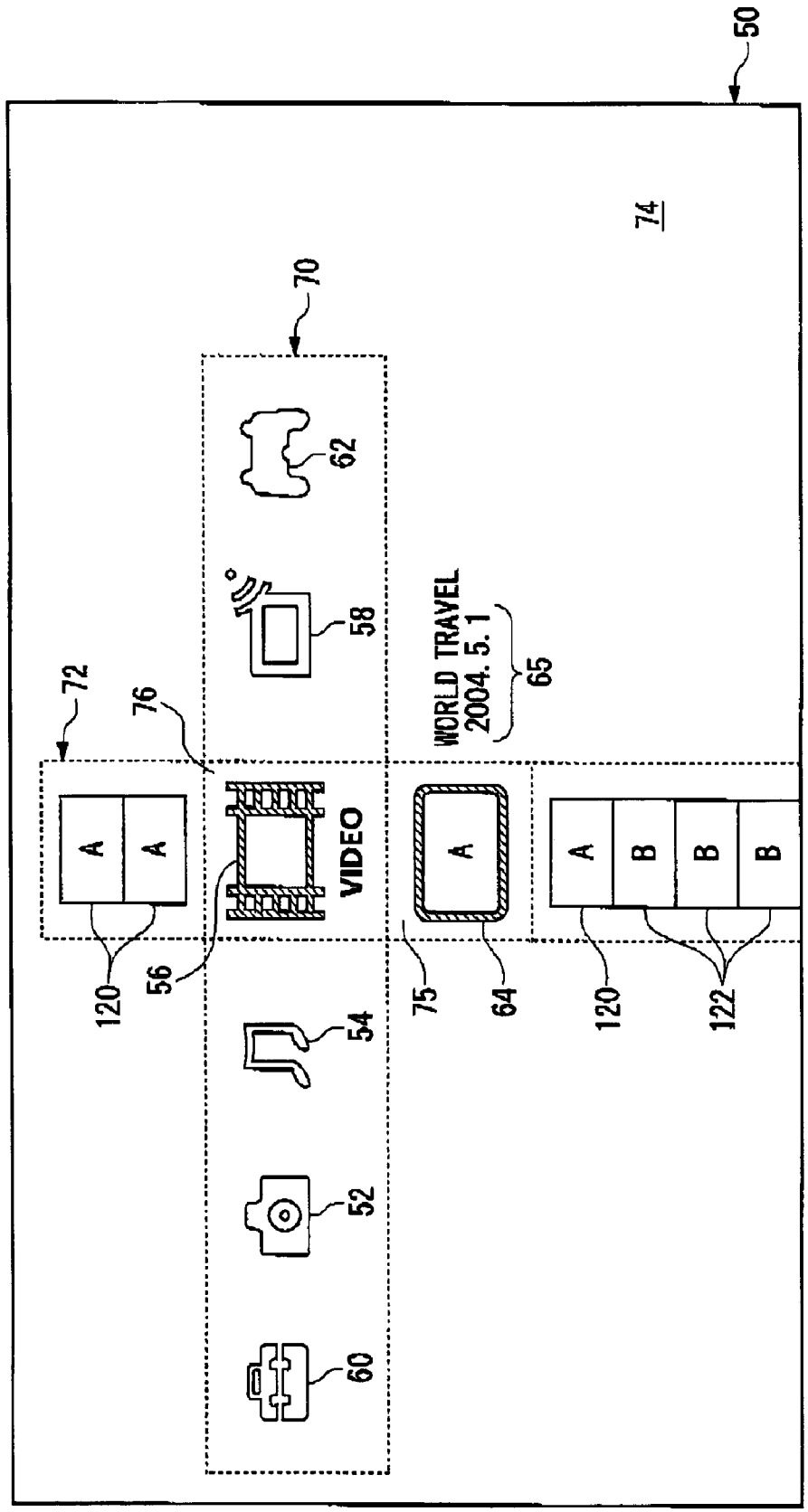
FIG. 3 shows the configuration of an on-screen menu generated by the multimedia player.

FIG. 3 shows the configuration of an on-screen menu generated by the multimedia player 20. In an on-screen menu 50, there are displayed a two-dimensional array in which intersect an array of function icons 70 in which multiple function icons are arranged horizontally and an array of content icons 72 in which multiple content icons are arranged vertically. The array of function icons 70 includes icons representing the types of functions that the multimedia player 20 is provided with. The array includes a photo icon 52, a music icon 54, a moving image icon 56, a broadcast icon 58, a game icon 62 and a configuration icon 60. The array of content icons 72 includes as icons thumbnails of multiple contents stored in the storage 80. The on-screen menu 50 comprised of the array of function icons 70 and the array of content icons 72 is presented as on-screen display. Normally, the menu is superimposed as a foreground of the content image. In case a content image currently reproduced is displayed in a background area 74, the effect processor 108 may apply a color to the entirety of areas where the array of function icons 70 and the array of content icons 72 are displayed, to distinguish the areas from the background area 74. Distinction in appearance may be effected by other methods including adjusting brightness of the content image.

The function icon located at the intersection of the array of function icons 70 and the array of content icons 72 is highlighted by a color different from that of the other function icons and by an enlarged view. An area of intersection 76 is made to remain practically at the center of the on-screen menu 50. The entirety of the array of function icons 70 is moved left or right in accordance with the user's instruction via the control 40 to move left or right. As the array is moved, the color and size of the function icon located in the area of intersection 76 change. The user can select a desired playing function merely by specifying left or right. There is no need to provide a decision-making instruction such as a click of a mouse normally performed by a PC user.

The effect processor 108 moves the function icons left or right by scrolling the entirety of the array of function icons 70 left or right. The effect processor 108 displays the function icons in the same color and same size as they are moved left or right. The effect processor 108 changes the color and size of the function icon located in the area of intersection 76. The effect processor 108 may change such attributes as brightness, chroma, hue, etc. of the function icon. Alternatively, the color may be changed by allowing the icon to flash. By displaying the function icon located in the area of intersection 76 in a display format different from that of the other function icons, the user can easily select a medium.

When the function icons are being moved left or right and none of the function icons is being located in the area of intersection 76, the effect processor 108 does not display the array of content icons 72. When one of the function icons is located in the area of intersection 76, the effect processor 108 shows an expanded view of the vertical array of content icons 72 above and below the area of intersection 76. The user can identify contents corresponding to the playing function merely by scrolling the function icons left or right, with the area of intersection 76 as a target area. The user can also identify the type of playing function by viewing the contents displayed in an expanded view. When there is an instruction to move left or right while the array of content icons 72 is being displayed, the effect processor 108 allows the expanded view of the array of content icons 72 to collapse toward the area of intersection 76.

An area in focus of attention (hereinafter, simply referred to as an area in focus) 75 is an area where the icon of the content subject to the user's manipulation is to be displayed. The area in focus 75 is placed practically at the center of the on-screen menu 50. The image processor 110 displays the array of function icons 70 such that the area of intersection 76 is located in the neighborhood of the area in focus 75, i.e., immediately above the area in focus 75. The area in focus 75 constitutes part of the array of content icons 72. The effect processor 108 displays an enlarged version of the content icon located in the area in focus 75 as an icon in focus 64. The other content icons are displayed in smaller size than the icon in focus 64. In the neighborhood (i.e., to the right) of the icon in focus 64, content information 65 such as the title of a movie and the date of recording is displayed as attributes of the content indicated by the icon in focus 64.

While the control 40 acquires the user's instruction to move up or down, the content icons are moved up or down in accordance with the instruction. The effect processor 108 moves the content icons up or down by scrolling the entirety of the array of content icons 72 up or down.

The effect processor 108 displays the content icons in the same size as they are moved up or down. The effect processor 108 enlarges the content icon located in the area in focus 75 as an icon in focus 64. The effect processor 108 may also change such attributes as brightness, chroma, hue, etc. of the icon in focus 64. Alternatively, the effect processor 108 may allow the icon in focus 64 to flash. When the control 40 acquires an instruction from the user designating playing of the content indicated by the icon in focus 64, the image-generator 110 places the image data for the on-screen menu in a non-display mode and the content controller 106 starts playing the selected content. When the user invokes the on-screen menu via the control 40 while the content is being played, the on-screen menu is superimposed on the content being played. The appearance of the menu that occurred when the content was selected for playing is maintained in the on-screen menu thus displayed.

The image generator 110 displays the array of function icons 70 slightly above the vertical center of the on-screen menu 50 and displays the array of content icons 72 slightly to the left of the horizontal center of the on-screen menu 50. This causes a combination of the icon in focus 64 and the content information 65 to be displayed practically at the center of the on-screen menu 50. The user can view the icon in focus 64 and the content information 65 at the center of the on-screen menu 50 and can easily recognize what they teach.

A photo icon 52 is an icon that represents the still image playing function and is selected to playing a still image. The image played is primarily a still image captured by a digital camera which is read from, for example, the memory card 38. The content icon displayed in an expanded view when the photo icon 52 is located in the area of intersection 76 is a thumbnail of the still image. The content information 65 may include shooting information such as the date of shooting and a file size.

A music icon 54 is an icon that represents the music playing function and is selected to playing music data. The music data played is generated, for example, by coding data read from the optical disk 36 in a specific compression format. The content icon displayed in an expanded view when the music icon 54 is located in the area of intersection 76 may be in units of music pieces or in units of albums. The content information 65 may include the title of a music piece or an album, playing time, etc. The music data may include moving image data such as a promotional video for the music. In this case, the thumbnail thereof may be used as the content icon.

A moving image icon 56 is an icon that represents the moving image playing function and is selected to playing moving images. The image played may be recorded images taken from a television program and input via the antenna cable 32, recorded images captured by a digital video camera or images read from the optical disk 36 or the external appliance. The images are coded in a specific compression format. Thumbnails produced by scaling down frames included in the moving images are used as a content icon. The content information 65 may include the date of recording or playing time.

A broadcast icon 58 is an icon that represents the broadcast display function and is selected to view a television program input via the antenna cable 32. The content icon displayed in an expanded view as a target of viewing may be in units of programs, in units of broadcasting station, or in units of broadcast channels. The content information 65 may include the name of a broadcasting station, the name of a broadcast channel, the title of a program or broadcast schedule acquired based on Electronic Program Guide (EPG) data.

A game icon 62 is an icon that represents the game running function and is selected to run a game program. The game program which is run is stored in the storage 80 or read from the optical disk 36. If the game program contains data for a game icon, the icon is displayed as a content icon. The content information 65 may include information such as the title of the game program.

A configuration icon 60 is an icon that represents the function for various configurations and is selected to change various configurations in the multimedia player 20.

The content icons included in the array of content icons 72 of the embodiment comprise a mixture of icons representing items of contents acquired from the storage 80 and items of contents acquired from the external appliance such as the first external appliance 37 or the second external appliance 39 connected via the network cable 34. For example, first content icons 120 and the icon in focus 64 marked by "A" in FIG. 3 represent contents acquired from the storage 80 of the multimedia player 20. Second content icons 122 marked by "B" represent contents acquired from the external appliance. While FIG. 3 shows marks "A" and "B" for convenience, no markings that are indicative of the origin of the contents are displayed and so there is no distinction in appearance between icons "A" and "E", because thumbnails of the contents are actually used as content icons. Therefore, an instruction for playing can be given via a single interface irrespective of which device the contents on the network are stored in. When the control 40 acquires an instruction for playing while one of the first content icons 120 or the second content icons 122 is being selected, the content controller 106 starts playing the content represented by the selected content icon. The user need not be aware of which device the contents are stored in and can provide an instruction for playing with a simple operation of selecting desired content from multiple contents and thus can enjoy great convenience.

Figure 4:
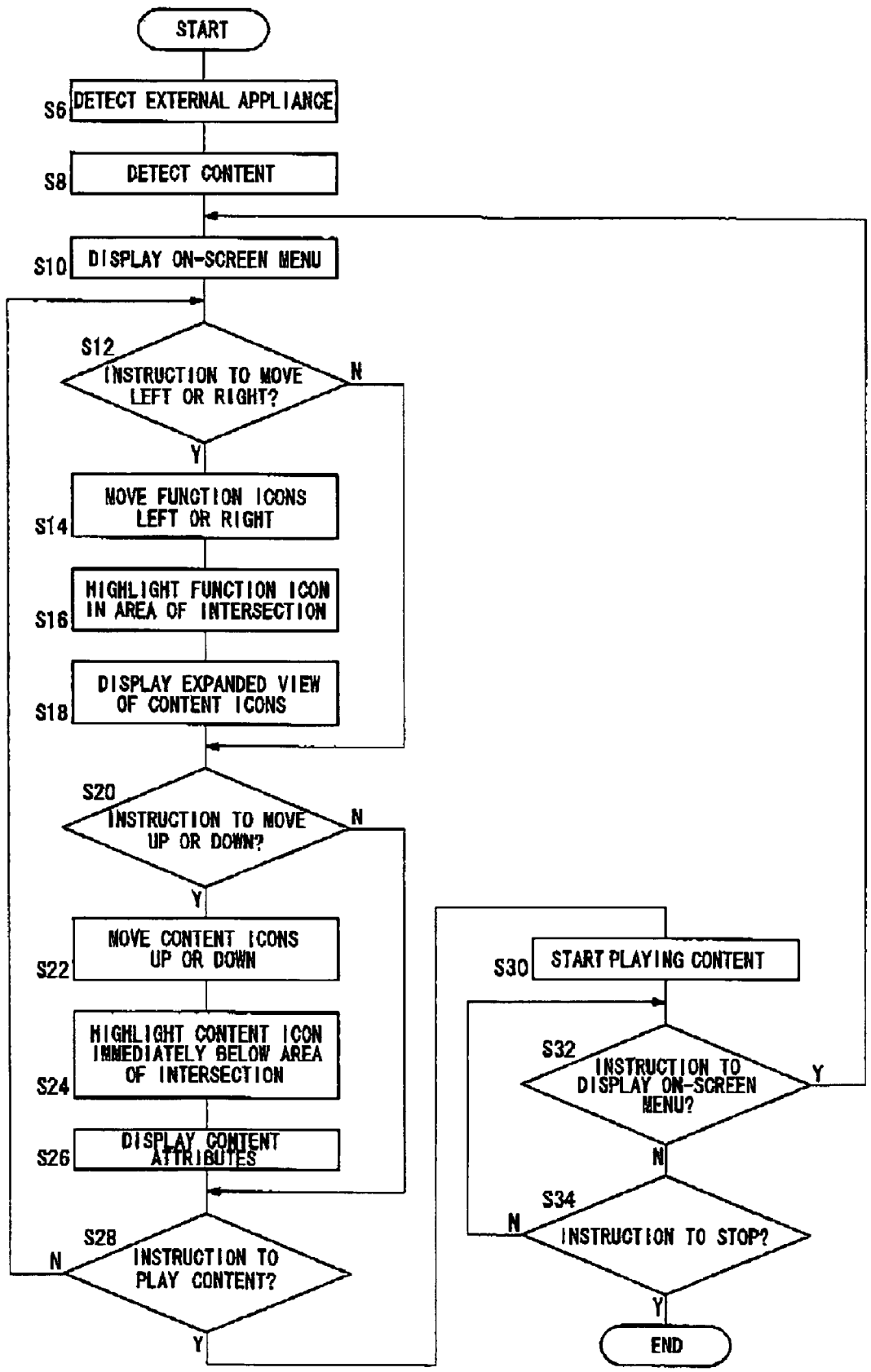
FIG. 4 is a flowchart showing the operating process of the multimedia player.

FIG. 4 is a flowchart showing the operating process of the multimedia player. When the user turns on the power of the multimedia player 20, the network controller 86 detects external appliances on the LAN 35 via the network cable 34 (S6) and detects items of contents from the external appliances and the storage 80 (S8). The image generator 110 acquires items such as function icons and content icons from the storage 80 so as to generate the on-screen menu. The display output module 46 causes the television set 30 to display the on-screen menu (S10). When the control 40 acquires the user's instruction to move left or right (S12Y), the effect processor 108 moves the function icons left or right in accordance with the instruction (S14) and highlights the function icon located in the area of intersection 76 (S16). Further, the effect processor 108 reads from the storage 80 or the external appliance the content icons corresponding to the highlighted playing function and shows a vertically expanded view of the content icons thus read (S18). While there is no instruction from the user to move left or right, steps S14-S8 are skipped (S12N).

When the control 40 acquires the user's instruction to move up or down (S20Y), the effect processor 108 responds to the instruction by moving the content icons up or down (S22), highlighting the content icon located in the area in focus 75 (S24) immediately below the area of intersection 76 and displaying associated content information to the right (S26). While there is no instruction from the user to move up or down in S20, steps S22-S26 are skipped (S20N).

Steps S12-S26 are repeated until the control 40 acquires the user's instruction to playing content (S28N). When the control 40 acquires an instruction to playing content (S28Y), the content controller 106 starts playing the highlighted content in the area in focus 75 (S42). When the control 40 acquires the user's instruction to invoke the on-screen menu 50 while the content is being played (S32Y), control jumps to S10, whereupon the steps S10-S28 are repeated. Absent the instruction from the user to invoke the on-screen menu, the content continues to be played (S32N). When the control 40 acquires an instruction from the user to stop playing the content while the content is being played, the content controller 106 stops playing the content (S34Y).

As described above, the multimedia player 20 displays the on-screen menu 50 comprising the array of playing function and the array of contents. The array of function icons 70 and the array of content icons 72 actually displayed each comprise a single line or a single row. By scrolling up, down, left or right, icons for different contents corresponding to different playing functions are displayed one after another. Therefore, an appearance of a large number of contents being displayed in a matrix over the entirety of the screen is given to the user. The user can select content as if by focusing on desired content while the user moves a matrix of a large number of contents as desired, Meanwhile, the number of icons actually displayed is relatively small so that a disorganized appearance is prevented. The user can select one content item after another merely by specifying up, down, left or right and so can enjoy comfortable and easy zapping. Since the icon in focus 64 continues to be located practically at the center of the on-screen menu 50, the user can select content as if by looking at desired content through a window provided at the center of the on-screen menu 50. Even when the player is remotely operated by the user away from the on-screen menu 50, the location of the icon in focus 64 is immediately identified. As it is not necessary for the user to look for the icon in focus 64 in the on-screen menu 50, an environment is offered in which the user can navigate through the menu in a relaxed manner.

Second Embodiment

The multimedia player 20 according to a second embodiment differs from the multimedia player 20 according to the first embodiment in that it displays multiple on-screen menus 50. The following description focuses on the difference from the first embodiment.

Figure 5:
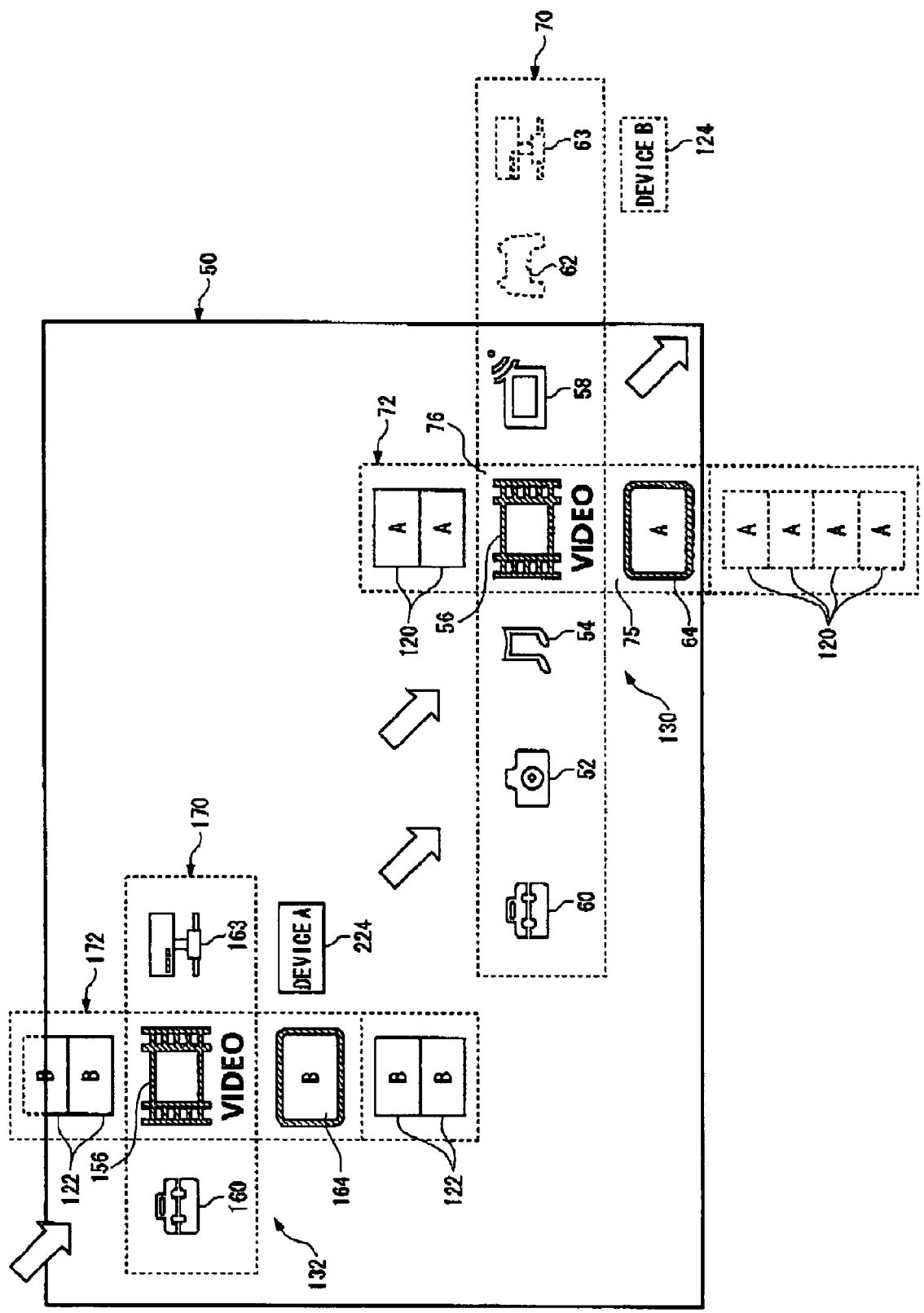
FIG. 5 schematically shows how items in an on-screen menu make transitions according to a second embodiment.

FIG. 5 schematically shows how items in an on-screen menu make transitions according to the second embodiment. The display controller 48 of the second embodiment displays in the on-screen menu 50 one or both of an interface for providing an instruction to playing content acquired from the storage 80 and an interface for providing an instruction to playing content acquired from external appliances. The display controller 48 displays a first set of intersecting arrays 130 practically at the center of the on-screen menu 50 before the illustrated transition occurs. The first set of intersecting arrays 130 is an interface for providing an instruction to playing content in a state when the multimedia player 20, one of the devices on the LAN 35, is being selected. When the user selects an external appliance such as the first external appliance 37 or the second external appliance 39, the display controller 48 switches from the first set of intersecting arrays 130 to a second set of intersecting arrays 132. The second set of intersecting arrays 132 is an interface for providing an instruction to playing content in a state when an external appliance is being selected.

Referring to FIG. 5, the effect processor 108 of the display controller 48 causes the entirety of the first set of intersecting arrays 130 displayed practically at the center of the on-screen menu 50 to move toward the bottom right of the screen and allows the second set of intersecting arrays 132 to appear at the top left of the screen and to move to a position practically at the center. A network icon 63 is displayed as a function icon at the right end of the array of function icons 70 of the first set of intersecting array 130. The network icon 63 is an icon that should be selected to display the type of device connected to the LAN 35 such as the external appliance detected by the network controller 86. Immediately below the network icon 63 is displayed a device icon 124 representing the type of device connected to the LAN 35 in a direction intersecting the array of function icons 70. The device icon 124 represents the external appliance such as the first external appliance 37 or the second external appliance 39. When the device icon 124 is selected, the first set of intersecting arrays 130 moves toward the bottom right corner and the second set of intersecting arrays 132 appears from top left of the screen. The first set of intersecting arrays 130 may remain visible at the bottom right corner of the screen, possibly with a reduced size. Alternatively, the first set of intersecting arrays 130 may be moved out of frame of the screen to disappear.

Similarly to the array of function icons 70, a second network icon 163 is displayed at the right end of the array of function icons 170 of the second set of intersecting arrays 132. Immediately below the second network icon 163 is displayed a second device icon 224. Icons other than the second device icon 224, which represents the multimedia player 20, are not displayed immediately below the second network icon 163. That is, icons representing other external appliances on the LAN 35 are not displayed. Thus, even in a set-up in which multiple external appliances are connected to the multimedia player 20 at the center, direct switching between an on-screen menu for one external appliance to an on-screen menu for another is disabled. The user can return to the first set of intersecting arrays 130 for the multimedia player 20 simply by selecting the second device icon 224 immediately below the second network icon 163 in the second set of intersecting arrays 132. In the illustrated example, the external appliances store only moving image contents. The second array of function icons 170 of the second set of intersecting arrays 132 includes, as function icons, a second moving image icon 156, a second configuration icon 160 and a second network icon 163, but does not include function icons corresponding to a photo, music, broadcast and a game. A second array of content icons 172 includes second content icons 122. Of these icons, the content icon located immediately below the second moving image icon 156 is highlighted as a second icon in focus 164. The second content icons 122 represent items of contents acquired from the external appliance.

When the control 40 acquires an instruction from the user to select the device icon 124 while the first set of intersecting arrays 130 is being displayed practically at the center of the screen, the display controller 48 moves the first set of intersecting arrays 130 and causes the second set of intersecting arrays 132 to appear. When the control 40 acquires an instruction to select the second device icon 224 while the second set of intersecting arrays 132 is being displayed practically at the center of the screen, the display controller 48 moves the second set of intersecting arrays 132 and causes the first set of intersecting arrays 130 to appear. When the control 40 acquires an instruction for playing while one of the first content icons 120 and the second content icons 122 is being selected, the content controller 106 starts playing the content represented by the selected content icon.

Thus, the multimedia player 20 according to this embodiment uses interfaces unique to the individual devices on the LAN 35 to display menus for providing an instruction to play content. The user can easily switch between on-screen menus for individual devices. Even when there are multiple devices on the LAN 35, the user will not be confused when trying to select desired content stored in a target device. While the second embodiment uses a method of transition in which the first set of intersecting arrays 130 and the second set of intersecting arrays 132 move from top left to bottom right, the arrays may be moved in any other direction. Alternatively, for example, the first set of intersecting arrays 130 may be switched to the second set of intersecting arrays 132 by causing the first set of intersecting arrays 130 to zoom out toward a viewer and causing the second set of intersecting arrays 132 to zoom in as if from the back of the screen. Alternatively, for example, the on-screen menu 50 may be divided into two so that the first set of intersecting arrays 130 and the second set of intersecting arrays 132 are displayed side by side.

Third Embodiment

The multimedia player 20 according to a third embodiment differs from the multimedia player 20 according to the foregoing embodiments in that it shows an expanded view of menus unique to individual devices in the on-screen menu 50. The following description focuses on the difference from the first and second embodiments.

Figure 6:
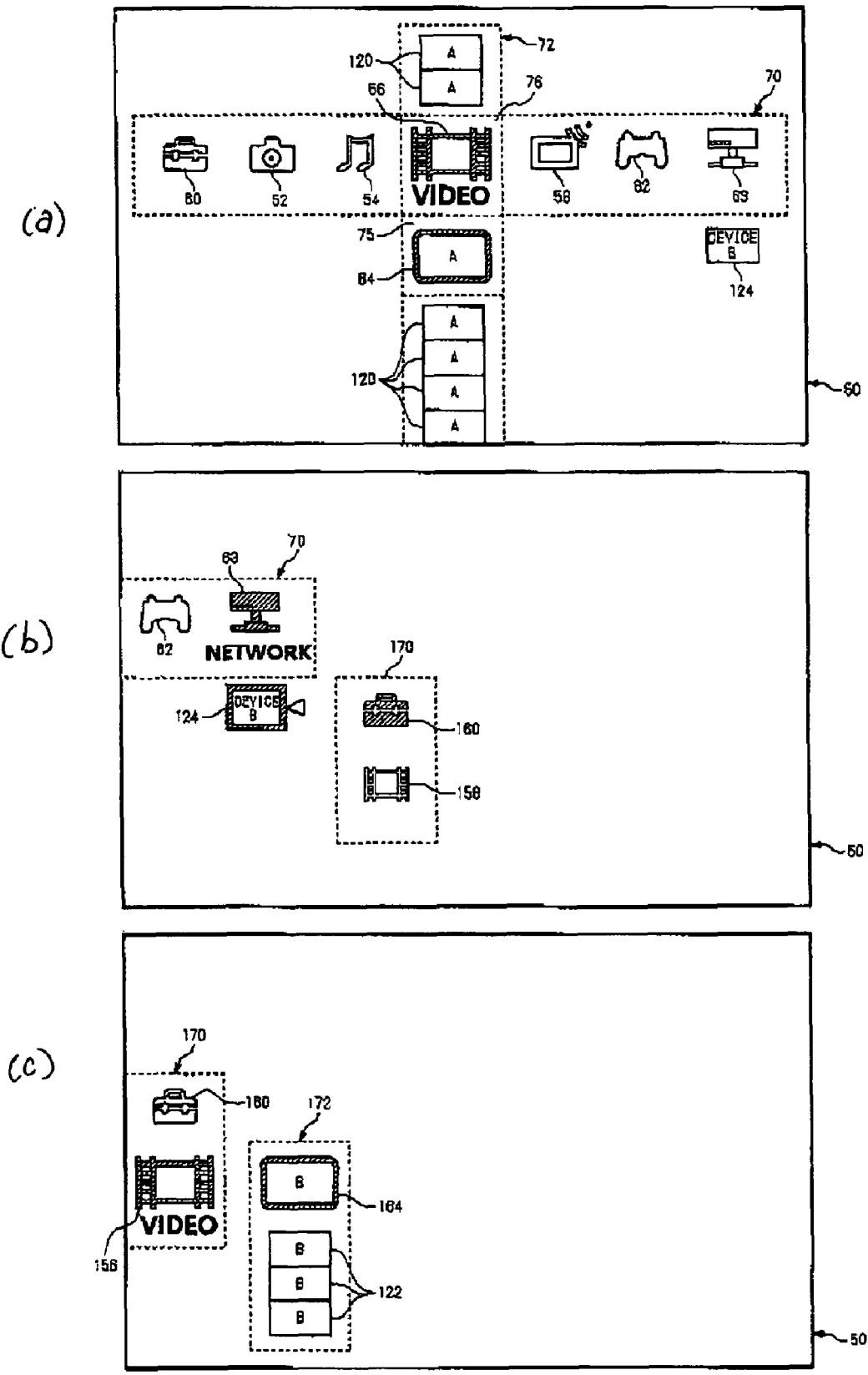
FIGS. 6A through 6C schematically show how items in an on-screen menu make transitions according to a third embodiment.

FIGS. 6A and 6B schematically show how items in an on-screen menu make transitions according to the third embodiment. As shown in FIG. 6A, the display controller 48 of the third embodiment displays the network icon 63 at the right end of the array of function icons 70 and displays the device icon 124 immediately below the network icon 63. In this respect, the intersecting arrays share features with the first set of intersecting arrays 130 of FIG. 5. The device icon 124 represents an external appliance on the LAN 35 such as the first external appliance 37 or the second external appliance 39. When the control 40 acquires from the user an instruction to select the device icon 124, the display controller 48 displays the second array of function icons 170 to the right of the device icon 124 as shown in FIG. 6B. The second array of function icons 170 is displayed in an expanded view in a direction intersecting the array of function icons 70. The second array of function icons 170 includes as function icons the second configuration icon 160 and the second moving image icon 156. The second array of function icons 170 is displayed practically at the horizontal center in the on-screen menu 50.

When the control 40 acquires an instruction from the user to move up or down, the effect processor 108 responds to the instruction by scrolling the second array of function icons 170 up or down and highlighting the function icon located to the right of the device icon 124. When the control 40 acquires an instruction to select one of the function icons included in the second array of function icons 170, the display controller 48 displays content icons corresponding to the selected function icon as the second array of content icons 172. The effect processor 108 moves the second array of function icons 170 to the left end of the screen and displays the second array of content icons 172 in an expanded view immediately to the right of the second array of function icons 170. The second array of content icons 172 includes the second content icons 122 and is displayed in parallel with the second array of function icons 170. The second content icons 122 represent contents acquired from the external appliance such as the first external appliance 37 or the second external appliance 39. The effect processor 108 highlights the icon located to the right of the function icon currently selected as the second icon in focus 164. When the control 40 acquires an instruction for playing while one of the second content icons 122 is being selected, the content controller 106 starts playing the content represented by the selected content icon. When the control 40 acquires an instruction from the user to move left, the effect processor 108 causes the second array of content icons 172 and/or the second array of function icons 170 to disappear in accordance with the number of times the instruction is given, in a transition from FIG. 6C to FIG. 6B or FIG. 6A. Accordingly, the user can easily return to the manipulation of contents in the multimedia player 20.

Thus, the multimedia player 20 according to this embodiment shows menus for providing an instruction to play content in a fashion unique to the individual devices on the LAN 35. The device icon explicitly shows the source device storing the contents represented in an expanded view. Accordingly the user can select content on a device by device basis. Even when there are multiple devices on the LAN 35, the user will not be confused when trying to select content.

Fourth Embodiment

The multimedia player 20 according to a fourth embodiment is similar to the player of the second embodiment in that it changes displayed contents entirely each time the target device for display in the on-screen menu 50 is changed. It differs from the player of the second embodiment in that it uses a single menu for display. The following description focuses on the difference from the first through third embodiments.

FIGS. 7A and 7B schematically show how items in an on-screen menu make transitions according to the fourth embodiment. In the illustrated example, moving image contents are stored both in the multimedia player 20 and the external appliances. Content icons representing contents retrieved from only one of the multimedia player 20 and the external appliances are displayed in the array of content icons 72 shown in an expanded view when the user selects the moving image icon 56. In the state of FIG. 7A, the array of content icons 72 includes the first content icons 120 representing items of contents stored in the multimedia player 20. The function icon representing an external appliance (device other than the multimedia player 20) is shown as the icon in focus 64 in the area in focus 75. When the control 40 acquires an instruction from the user to select the device icon which is the icon in focus 64, the effect processor 108 switches from the first content icons 120 to the second content icons 122, as shown in FIG. 7B, for inclusion in the array of content icons 72. Moreover, the effect processor 106 switches from the device icon representing an external appliance to the device icon representing the multimedia player 20 for display as the icon in focus 64. The second content icons 122 represent contents in the external appliance. When the control 40 acquires an instruction for playing while one of the second content icons 122 is being selected, the content controller 106 starts playing the content represented by the selected content icon. When the device icon representing the multimedia player 20 is selected by the user when the screen appears as shown in FIG. 7B, the effect processor 108 changes the array of content icons 72 to include the first content icons 120, as shown in FIG. 7A.

Thus, the multimedia player 20 according to this embodiment switches between menus for providing an instruction to play content, in relation to the individual devices on the LAN 35. The same method continues to be used in displaying an expanded view of content icons irrespective of which device is selected. Therefore, the user is presented with a consistent interface to select contents. Even when there are multiple devices on the LAN 35, the user will not be confused when trying to select content.

Fifth Embodiment

The multimedia player 20 according to a fifth embodiment is similar to the player of the fourth embodiment in that it switches between menus of contents acquired from multiple devices for display in the on-screen menu 50, in relation to the individual devices. A primary difference consists in the location of devices icons. The following description focuses on the difference from the first through fourth embodiments.

FIGS. 8A and 8B schematically show how items in an on-screen menu make transitions according to the fifth embodiment. In the illustrated example, moving image contents are stored both in the multimedia player 20 and the external appliances. Content icons representing contents retrieved from only one of the multimedia player 20 and the external appliances are displayed in the array of content icons 72 shown in an expanded view when the user selects the moving image icon 56. FIG. 8A shows a state in which the contents in the multimedia player 20 are selected as targets of display on the menu. FIG. 8B shows a state in which the contents of the external devices are selected as targets of display on the menu. In the state of FIG. 8A, the array of content icons 72 includes the first content icons 120 representing items of contents stored in the multimedia player 20. One of the first content icons 120 located in the area in focus 75 is highlighted as the icon in focus 64. The array of function icons 70 includes the network icon 63 at the right end. The device icon 124 is displayed immediately below the network icon 63. The device icon 124 in FIG. 8A represents the external appliance (device other than the multimedia player 20).

As shown in FIG. 8B, when the control 40 acquires an instruction from user to select the device icon 124, the display controller 48 responds to the instruction by switching from the contents in the multimedia player 20 to the contents in the external appliance for display in the menu. Only those playing functions corresponding to the contents stored in the external appliance are displayed in a normal fashion in the array of function icons 70 of FIG. 8B. Playing functions not corresponding to the contents in the external appliance (for example, the photo icon 52, the music icon 54, the broadcast icon 58, the game icon 62) are displayed semi-transparently or grayed, indicating that the user cannot select them. The second array of content icons 172 includes the second content icons 122 representing items of contents acquired from the external appliance. Of these, the icon located in the area in focus 75 is highlighted as the icon in focus 64. When the control 40 acquires an instruction for playing while one of the second content icons 122 is being selected, the content controller 106 starts playing the content represented by the selected content icon. Immediately below the network icon 63 displayed at the right end of the array of function icons 70, the icon representing the multimedia player 20 is displayed as the device icon 124. When the control 40 acquires an instruction from user to select the device icon 124, the display controller 48 responds to the instruction by switching from the contents in the external appliance to the contents in the multimedia player 20 for display in the menu as shown in FIG. 8A.

Thus, the multimedia player 20 according to this embodiment switches between menus for providing an instruction to play content, in relation to the individual devices on the LAN 35. The same method continues to be used in displaying an expanded view of content icons irrespective of which device is selected. Therefore, the user is presented with a consistent interface to select contents. Even when there are plural devices on the LAN 35, the user will not be confused when trying to select content.

Sixth Embodiment

The multimedia player 20 according to a sixth embodiment is similar to the player of the second through fifth embodiments in that it displays menus of contents acquired from multiple devices in the on-screen menu 50 in relation to individual devices. A primary difference consists in the method of providing an expanded view of contents in external appliances. The following description focuses on the difference from the other embodiments.

FIGS. 9A and 9B schematically show how items in an on-screen menu make transitions according to the sixth embodiment. In this embodiment, too, moving image contents are stored both in the multimedia player 20 and the external appliances. The array of content icons 72 displayed in an expanded view when the moving image icon 56 is selected by the user includes the first content icons 120 representing contents acquired from the multimedia player 20. FIG. 9A shows a state in which the contents in the multimedia player 20 are selected for display in the menu. The array of content icons 72 further includes the device icon 124 representing the external appliance (device other than the multimedia player 20). When the control 40 acquires an instruction for playing while one of the first content icons 120 is being selected, the content controller 106 starts playing the content represented by the selected content icon.

As shown in FIG. 9S, when the control 40 acquires an instruction from user to select the device icon 124, the effect processor 108 responds to the instruction by displaying the second array of content icons 172 to the right of the device icon 124 and in parallel with the array of content icons 72. In this process, the effect processor 108 shifts the entirety of menu left so that the device icon 124 is displayed at the left end of the screen. The second array of content icons 172 includes the second content icons 122 representing items of contents in the external appliance. Of these, the display controller 48 highlights the icon located to the right of the device icon 124 as the second icon in focus 164. When the control 40 acquires an instruction for playing, the content controller 106 starts playing the content represented by the content icon selected as the second icon in focus 164. When the control 40 acquires an instruction from the user to move left or to cancel, the effect processor 108 returns the appearance from FIG. 9B to FIG. 9A.

Thus, the multimedia player 20 according to the sixth embodiment displays menus for providing an instruction to play content in relation to the individual devices on the LAN 35. Moreover, since an expanded view of the contents in the external appliances are displayed in a fashion different from that of the contents in the multimedia player 20, the user will not be confused when trying to select content even when there are multiple devices on the LAN 35.

Seventh Embodiment

The multimedia player 20 according to a seventh embodiment is similar to the player of the second through sixth embodiments in that it displays menus of contents acquired from multiple devices in the on-screen menu 50 in relation to individual devices. A primary difference consists in the method of providing an expanded view of contents in the external appliances. The following description focuses on the difference from the other embodiments.

FIGS. 10A and 10B schematically show how items in an on-screen menu make transitions according to the seventh embodiment. In this embodiment, too, moving image contents are stored both in the multimedia player 20 and the external appliances. Content icons representing contents retrieved from the multimedia player 20 are included in the array of content icons 72 shown in an expanded view when the user selects the moving image icon 56. FIG. 10A shows a state in which the contents in the multimedia player 20 are selected for display in the menu. The array of content icons 72 further includes the device icon 124 representing the external appliance (device other than the multimedia player 20). As shown in FIG. 10B, when the control 40 acquires an instruction from user to select the device icon 124, the effect processor 108 responds to the instruction by displaying the second moving image icon 156 between the moving image icon 56 and the broadcast icon 58 to provide an expanded view of contents in the external appliance. The effect processor 10B displays the second array of content icons 172 in a direction intersecting the array of function icons 70 at the position of the second moving image icon 156. The second array of content icons 172 includes the second content icons 122 and a clear icon 140. The second content icons 122 represent items of contents in the external appliance. When the control 40 acquires an instruction for playing while one of the second content icons 122 is being selected, the content controller 106 starts playing the content represented by the selected content icon. The clear icon 140 is an icon selected to cause the second array of content icons 172 to disappear. When the control 40 acquires an instruction from the user to select the clear icon 140, the display controller 46 causes the second array of content icons 172 to disappear as if to be accommodated in the location of the second moving image icon 156.

Thus, the multimedia player 20 according to the seventh embodiment displays menus for providing an instruction to play content in relation to the individual devices on the LAN 35. Accordingly the user can select contents on a device by device basis. Even when there are multiple devices on the LAN 35, the user will not be confused when trying to select content.

Eighth Embodiment

The multimedia player 20 according to an eighth embodiment is similar to the player of the second through seventh embodiments in that it displays menus of contents acquired from multiple devices in the on-screen menu 50 in relation to individual devices. A primary difference consists in the method of providing an expanded view of contents in external appliances. The following description focuses on the difference from the other embodiments.

FIGS. 11A and 11B schematically shows how items in an on-screen menu make transitions according to the eighth embodiment. In this embodiment, too, moving image contents are stored both in the multimedia player 20 and the external appliances. The array of content icons 72 displayed in an expanded view when the moving image icon 56 is selected by the user includes content icons representing contents acquired from the multimedia player 20. Similarly to FIG. 10A, FIG. 11A shows a state in which the contents in the multimedia player 20 are selected for display in the menu. The array of content icons 72 further includes the device icon 124 representing the external appliance (device other than the multimedia player 20). As shown in FIG. 11B, when the control 40 acquires an instruction from user to select the device icon 124, the effect processor 108 responds to the instruction by displaying the second content icons 122 between the device icon 124 and the first content icons 120. Accordingly, the array of content icons 72 includes a mixture of the first content icons 120 and the second content icons 122. When the control 40 acquires an instruction for playing while one of the first content icons 120 and the second content icons 122 is being selected, the content controller 106 starts playing the content represented by the selected content icon. When the control 40 acquires an instruction from the user to cancel, the display controller 48 causes the second content icons 122 to disappear as if to be accommodated in device icon 124 and returns the appearance to FIG. 11A.

Thus, the multimedia player 20 according to the eighth embodiment switches between display and non-display of icons in relation to individual devices on the LAN 35, while continuing to use the same menu for providing an instruction for playing, thereby allowing easy access to the contents stored in the external appliances. Accordingly the user can select contents on a device by device basis. Even when there are multiple devices on the LAN 35, the user will not be confused when trying to select content.

Ninth Embodiment

The multimedia player 20 according to an ninth embodiment is similar to the player of the second through eighth embodiments in that it displays menus of contents acquired from multiple devices in the on-screen menu 50 in relation to individual devices. A primary difference consists in the method of providing an expanded view of contents in external appliances. The following description focuses on the difference from the other embodiments.

FIGS. 12A and 12B schematically shows how items in an on-screen menu make transitions according to the ninth embodiment. In this embodiment, moving image contents are stored both in the multimedia player 20 and the external appliances. The array of content icons 72 displayed in an expanded view when the moving image icon 56 is selected by the user includes content icons representing contents acquired from the multimedia player 20. FIG. 12A shows a state in which the contents in the multimedia player 20 are selected for display in the menu. The array of function icons 70 includes the network icon 63 at the right end. The device icon 124 is displayed immediately below the network icon 63. The device icon 124 represents the external appliance (device other than the multimedia player 20 on the LAN 35). When the control 40 acquires an instruction by the user to select the device icon 124, the effect processor 108 moves the array of content icons 72, the photo icon 52, the music icon 54 and the moving image icon 56 left by a distance of one icon. The effect processor 108 displays the second moving image icon 156 between the moving image icon 56 and the broadcast icon 58. The second moving image icon 156 represents the playing function relative to the contents in the external appliances and is distinguished from the moving image icon 56. The effect processor 108 displays the second array of content icons 172 in a direction intersecting the array of function icons 70 at the second moving image icon 156. The second array of content icons 172 includes the second content icons 122. The second content icons 122 represent items of contents in the external appliance. Of the second content icons 122, the icon located in the area in focus 75 immediately below the second moving image icon 156 is highlighted by the effect processor 108 as the icon in focus 64. When the control 40 acquires an instruction for playing while one of the second content icons 122 is being selected, the content controller 106 starts playing the content represented by the selected content icon. When the control 40 acquires an instruction from the user to cancel, the effect processor 108 returns the appearance from FIG. 12B to FIG. 12A.

While FIGS. 12A and 12B show that only moving image contents are stored both in the multimedia player 20 and the external appliances, other contents such as still images or music may be stored both in the multimedia player 20 and the external appliances. In this case, a second music icon is inserted between the music icon 54 and the moving image icon 56, and a second photo icon is inserted between the photo icon 52 and the music icon 54, as in FIG. 12B. Selecting the inserted icon causes an array of contents including the icon to be displayed in an expanded view.

Thus, the multimedia player 20 according to the ninth embodiment additionally displays icons in the same menu for providing an instruction to play content, in relation to the individual devices on the LAN 35. Accordingly, the user can select contents on a device by device basis. Even when there are multiple devices on the LAN 35, the user will not be confused when trying to select content.

Described above is an explanation based on the embodiments. These embodiments are only illustrative in nature and it will be obvious to those skilled in the art that variations in constituting elements and processes are possible and that such variations are also within the scope of the present invention. Several of those variations will now be described.

In the described embodiments, it is assumed that moving image contents are acquired from the external appliance and played in the multimedia player 20. In one variation, contents stored in the external appliance may be played by the external appliance so that images played are acquired by the multimedia player 20 and output to the television set 30. Alternatively, the multimedia player 20 may transmit an instruction for playing from the user to the external appliance so that the external appliance outputs the image played directly to the television set 30, bypassing the multimedia player 20. In this case, the multimedia player 20 and on-screen menus provided by the embodiments function as a remote controller to control the external appliance.

In the described embodiments, it is assumed that moving image contents are stored both in the multimedia player 20 and the external appliances. In one variation, contents other than moving images such as photos, music and games may be stored both in the multimedia player 20 and the external appliances. In this case, items of contents such as photos, music and games stored in the external appliances are displayed in the on-screen menu 50, by using similar methods as used to display items of moving image contents in the embodiments.

In the described embodiments, the on-screen menu is configured such that the area of intersection 76 is located immediately above the area in focus 75. In one variation, the on-screen menu may be designed such that the area of intersection 76 is located immediately below the area in focus 75 or in the neighborhood thereof, as long as the user can easily view the function icons without turning his or her eyes from the icon in focus 64. In the described embodiments, the array of function icons 70 and the array of content icons 72 are displayed horizontally and vertically, respectively, in the on-screen menu 50. In one variation, the array of function icons 70 and the array of content icons 72 may be displayed diagonally.

In the described embodiments, the function icon and the content icon displayed in the area of intersection 76 and the area in focus 75, respectively, are highlighted. In one variation, icons other than the function icon and the content icon, which are displayed in the area of intersection 76 and the area in focus 75, respectively, are displayed with graded color change that occurs toward the edge of the on-screen menu 50, so that the icons at the center of the on-screen menu 50 are relatively highlighted. The graded color change may be a change in which brightness or chroma decreases toward the edge. Alternatively, the alpha value used for blending with the content image being played in the background area 74 may be lowered toward the edge.

In the described embodiments, the multimedia player 20 is designed such that the area of intersection 76 and the area in focus 75 are located practically in the center of the on-screen menu 50. In one variation, the display position of the area of intersection 76 and the area in focus 75 may be user configurable. More specifically, while it is preferable that the area of intersection 76 and the area in focus 75 be displayed practically at the center of the on-screen menu 50, flexibility may be provided by allowing the position thereof to be configurable.

INDUSTRIAL USABILITY

The present invention is applicable to the interface of a multimedia player.

The invention claimed is:

1. A multimedia player capable of playing back contents, comprising:
   a control which acquires an instruction for playback of content via a user's manipulation;
   a storage which stores data for a plurality of function icons representing respective types of content playback functions, the content to be played back by the player, and data for a plurality of content icons representing respective items of contents;
   a network controller which detects an external appliance connected to the player via a network and acquires the items of contents to be played back from the external appliance thus detected;
   a display output module which outputs image data for an on-screen menu related to playback of the content to a display device and which plays back the content acquired from the storage in response to the user's instruction acquired by the control;
   a display controller which generates the image data for the on-screen menu with a two-dimensional array which includes a first array comprising the plurality of function icons arranged in a specific direction on a screen and which also includes a second array comprising the plurality of content icons in a direction intersecting the first array on the screen, wherein
   the display controller displays a plurality of device icons each representing the external appliance detected by the network controller in the second array, when one of the content playback functions is selected in accordance with the user's instruction acquired by the control, the display controller displays the content icons corresponding to the selected content playback function and representing the items of contents acquired from the storage in the on-screen menu, and when one of the device icons is selected by the user, the display controller identifies the items of contents acquired from the external appliance represented by the selected device icon and displays an expanded view within a second array of the content icons representing the identified items of contents, wherein a combination of content items from storage and icons corresponding to only the selected device are displayed in the second array.

2. The multimedia player according to claim 1, wherein the network controller acquires, via the network, the content to be played from the external appliance in response to the user's instruction for playing acquired by the control, and
   the display output module plays the content acquired from the external appliance, in accordance with the user's instruction for playing acquired by the control.

3. The multimedia player according to claim 1, wherein the display controller mixes, in the second array, the content icons representing the items of contents acquired from the storage and the content icons representing the items of contents acquired from the external appliance.

4. The multimedia player according to claim 1, wherein the display controller includes, in the first array, the function icon representing the type of content playing function of the external appliance detected by the network controller, and displays a device icon representing the external appliance thus detected in the neighborhood of the function icon in a direction intersecting the first array.

5. The multimedia player according to claim 1, wherein the display controller displays device icons each representing the external appliance detected by the network controller in the on-screen menu, and, when one of the device icons is selected by the user, moves the selected device icon and the first array in the specific direction, and displays an expanded view of the content icons representing the items of contents acquired from the external appliance in an area that had been occupied by the selected device icon in a direction intersecting the first array.

6. The multimedia player according to claim 1, wherein the display controller displays device icons representing devices, including the multimedia player, connected to the network in the on-screen menu and, when one of the device icons is selected by the user, switches the content icons included in the second array to the content icons representing the items of contents acquired from the device represented by the selected device icon.

7. The multimedia player according to claim 1, wherein, when one of the function icons included in the first array is selected by the user, the display controller provides an expanded view of the second array at the position of the selected function icon and mixes, in the second array, a device icon representing the external appliance and the content icons representing the items of contents acquired from the storage, and
   when the device icon is selected, the display controller displays the selected device icon between the selected function icon and the adjacent function icon, and provides, at the position of the device icon, an expanded view of the content icons representing the items of contents acquired from the external appliance.

8. A method of displaying an on-screen menu in a content player, comprising:
   reading data for a plurality of function icons representing respective types of content playback functions, and data for a plurality of content icons representing respective items of contents;
   detecting an external appliance connected to the player via a network;
   acquiring the items of contents to be played back from the external appliance thus detected via the network;
   generating image data for the on-screen menu with a two-dimensional array which includes a first array comprising the plurality of function icons arranged in a specific direction on a screen and which also includes a second array comprising the plurality of content icons in a direction intersecting the first array on the screen; and
   outputting the image data for the on-screen menu related to playback of the content to a display device, wherein
   the generating displays a plurality of device icons each representing the external appliance detected by the detecting in the second array, when one of the content playback functions is selected in accordance with the user's instruction, the generating displays the content icons corresponding to the selected content playback function and representing the items of contents acquired from the player in the on-screen menu, and when one of the device icons is selected by the user, the generating identifies the items of contents acquired from the external appliance represented by the selected device icon, and displays an expanded view within a second array of the content icons representing the identified items of contents, wherein a combination of content items from storage and icons corresponding to only the selected device are displayed in the second array.

9. The method of displaying an on-screen menu according to claim 8, wherein the generating mixes, in the second array, the content icons representing the items of contents acquired from the player and the content icons representing the items of contents acquired from the external appliance.

10. The method of displaying an on-screen menu according to claim 8, wherein the generating includes, in the first array, the function icon representing the type of the external appliance thus detected, and displays a device icon representing the external appliance thus detected in the neighborhood of the function icon in a direction intersecting the first array.

11. The method of displaying an on-screen menu according to claim 8, wherein the generating displays device icons each representing the external appliance thus detected in the on-screen menu, and, when one of the device icons is selected by the user, moves the selected device icon and the first array in the specific direction, and displays an expanded view of the content icons representing the items of contents acquired from the external appliance in an area that had been occupied by the selected device icon in a direction intersecting the first array.

12. The method of displaying an on-screen menu according to claim 8, wherein the generating displays device icons representing devices, including the player, connected to the network in the on-screen menu and, when one of the device icons is selected by the user, switches the content icons included in the second array to the content icons representing the items of contents acquired from the device represented by the selected device icon.

13. The method of displaying an on-screen menu according to claim 8, wherein, when one of the function icons included in the first array is selected by the user, the generating provides an expanded view of the second array at the position of the selected function icon and mixes, in the second array, a device icon representing the external appliance and the content icons representing the items of contents acquired from the player, and when the device icon is selected, displays the selected device icon between the selected function icon and the adjacent function icon, and provides, at the position of the device icon, an expanded view of the content icons representing the items of contents acquired from the external appliance.

14. A computer-readable medium having stored thereon a program executable by a controller for displaying an on-screen menu in a content player, comprising:

an acquiring module which acquires an instruction related to playback of content via a user's manipulation;

a storing module which stores data for a plurality of function icons representing respective types of content playback functions, the content to be played back by the player, and data for a plurality of content icons representing respective items of contents;

a detecting module which detects an external appliance connected to the player via a network and acquiring the items of contents to be played back from the external appliance thus detected via the network;

a playback module which outputs image data for an on-screen menu related to playback of the content to a display device and which plays back the content acquired from the player in response to the user's instruction; and a generating module which generates image data for the on-screen menu with a two-dimensional array which includes a first array comprising the plurality of function icons arranged in a specific direction on a screen and which also includes a second array comprising the plurality of content icons in a direction intersecting the first array on the screen, wherein the generating module displays a plurality of device icons each representing the external appliance detected by the detecting in the second array, when one of the content playback functions is selected in accordance with the user's instruction, the generating module displays the content icons corresponding to the selected content playback function and representing the items of contents acquired from the player in the on-screen menu, and when one of the device icons is selected by the user, the generating module identifies the items of contents acquired from the external appliance represented by the selected device icon, and displays an expanded view within a second array of the content icons representing the identified items of contents, wherein a combination of content items from storage and icons corresponding to only the selected device are displayed in the second array.

15. The computer-readable medium according to claim 14, wherein the acquiring module acquires, via the network, the content to be played from the external appliance in response to the user's instruction for playing, and the playing module plays the content acquired from the external appliance, in accordance with the user's instruction for playing.

16. The computer-readable medium according to claim 14, wherein the generating module mixes, in the second array, the content icons representing the items of contents acquired from the player and the content icons representing the items of contents acquired from the external appliance.

17. The computer-readable medium according to claim 14, wherein the generating module includes, in the first array, the function icon representing the type of the external appliance thus detected, and displays a device icon representing the external appliance thus detected in the neighborhood of the function icon in a direction intersecting the first array.

18. The computer-readable medium according to claim 14, wherein the generating module displays device icons each representing the external appliance detected by the network controller in the on-screen menu, and, when one of the device icons is selected by the user, moves the selected device icon and the first array in the specific direction, and displays an expanded view of the content icons representing the items of contents acquired from the external appliance in an area that had been occupied by the selected device icon in a direction intersecting the first array.

19. The computer-readable medium according to claim 14, wherein the generating module displays device icons representing devices, including the multimedia player, connected to the network in the on-screen menu and, when one of the device icons is selected by the user, switches the content icons included in the second array to the content icons representing the items of contents acquired from the device represented by the selected device icon.

20. The computer-readable medium according to claim 14, wherein, when one of the function icons included in the first array is selected by the user, the generating module provides an expanded view of the second array at the position of the selected function icon and mixes, in the second array, a device icon representing the external appliance and the content icons representing the items of contents acquired from the player, and when the device icon is selected, displays the selected device icon between the selected function icon and the adjacent function icon, and provides, at the position of the device icon, an expanded view of the content icons representing the items of contents acquired from the external appliance.

* * * * *